US008325701B2

(12) United States Patent
Yamauchi et al.

(10) Patent No.: US 8,325,701 B2
(45) Date of Patent: Dec. 4, 2012

(54) RADIO COMMUNICATION SYSTEM AND RADIO COMMUNICATION METHOD

(75) Inventors: Takahisa Yamauchi, Tokyo (JP); Yukimasa Nagai, Tokyo (JP); Akinori Taira, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 732 days.

(21) Appl. No.: 12/439,586

(22) PCT Filed: Aug. 29, 2007

(86) PCT No.: PCT/JP2007/066759
§ 371 (c)(1),
(2), (4) Date: May 1, 2009

(87) PCT Pub. No.: WO2008/029686
PCT Pub. Date: Mar. 13, 2008

(65) Prior Publication Data
US 2010/0016023 A1    Jan. 21, 2010

(30) Foreign Application Priority Data

Sep. 1, 2006  (JP) .................................. 2006-238058
Apr. 27, 2007  (JP) .................................. 2007-119372

(51) Int. Cl.
*H04J 1/00* (2006.01)
(52) U.S. Cl. ..................................... 370/343; 455/562.1
(58) Field of Classification Search .................. 370/434, 370/343; 455/562.1
See application file for complete search history.

(56) References Cited

U.S. PATENT DOCUMENTS 5,628,052 A * 5/1997 DeSantis et al. ........... 455/562.1
2004/0038684 A1* 2/2004 Sugaya ........................ 455/450
2005/0227698 A1 10/2005 Nonin et al.
2005/0243940 A1* 11/2005 Huh et al. ..................... 375/260
2007/0218897 A1* 9/2007 Yukizaki et al. ........... 455/432.1
2008/0182580 A1* 7/2008 Laroia et al. .................. 455/440

FOREIGN PATENT DOCUMENTS

JP    8-88599 A    4/1996
JP    8-237181     9/1996

(Continued)

OTHER PUBLICATIONS

Japanese Office Action issued on May 24, 2011 in corresponding Japanese Application No. 2008-533116.
Ohyama, T. et al., "Research and Development of Multi-Gigabit Wireless LAN Systems (2)—Development of Time-Space Media Access Control", The Institute of Electronics, Information and Communication Engineers, p. 550 (2006) (with English translation).

(Continued)

Primary Examiner — Sai-Ming Chan
(74) Attorney, Agent, or Firm — Oblon, Spivak, McClelland, Maier & Neustadt, L.L.P.

(57) ABSTRACT

A base station of a radio communication system emits a radio wave having the same frequency by time division toward a plurality of specific areas from a plurality of antenna elements by using a multiple-beam antenna to form a plurality of spot beams, and transmits broadcast information through a plurality of beacon channels. Upon reception of the broadcast information, a terminal that exists in any one of the plurality of specific areas selects an optimum beacon channel, and transmits a communication establishment request and a bandwidth request to the base station through a request channel corresponding to information for identifying the antenna element, which is included in the broadcast information received through the selected optimum beacon channel. Upon reception of the requests, the base station schedules, when a channel is to be allocated, a channel allocation time including downlink and uplink data bandwidths and the like.

12 Claims, 20 Drawing Sheets

FOREIGN PATENT DOCUMENTS

| | | |
|---|---|---|
| JP | 8-288901 | 11/1996 |
| JP | 8 289360 | 11/1996 |
| JP | 2001-268631 | 9/2001 |
| JP | 2003 304577 | 10/2003 |
| JP | 2005 277862 | 10/2005 |
| JP | 2006 520109 | 8/2006 |

OTHER PUBLICATIONS

Office Action issued Aug. 9, 2011 in Japan Application No. 2008-533116.

U.S. Appl. No. 12/518,162, filed Jun. 8, 2009, Nagai, et al.

* cited by examiner

INTERFERENCE REGION

FIG. 12

| MAC Header | | | |
|---|---|---|---|
| Frame Control | PNID | Destination ID | Source ID |

FIG. 13

| MAC Header | | | | | |
|---|---|---|---|---|---|
| Frame Control | PNID | Destination ID | Source ID | Fragment Control | Stream Index |

FIG. 15

| Num Frame | PNID | Device address | Beam ID | Num Beam | Num FCH | Pointer to FCH | Num RCH | Pointer to RCH | Beacon Interval | Supported Rate | Reserved |

MSDU

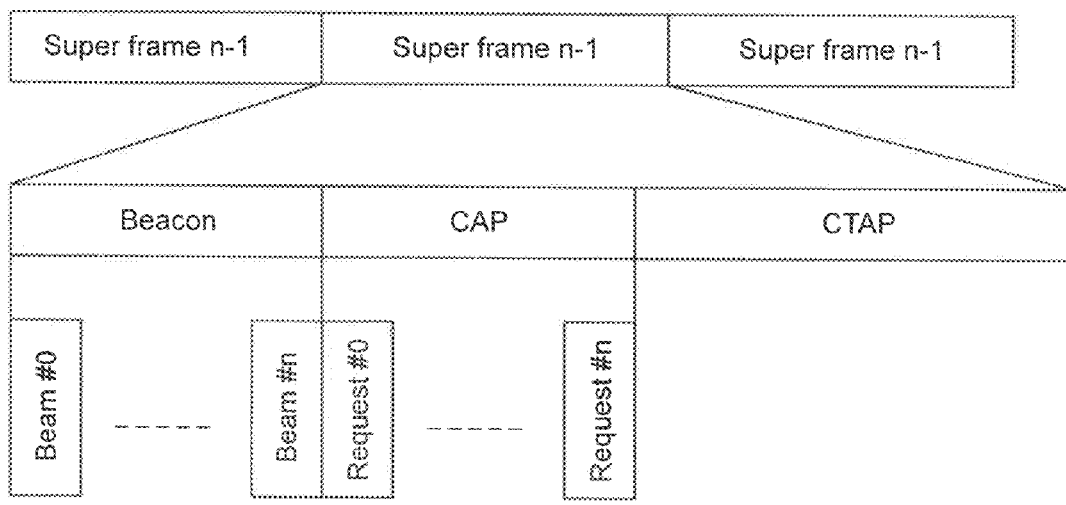

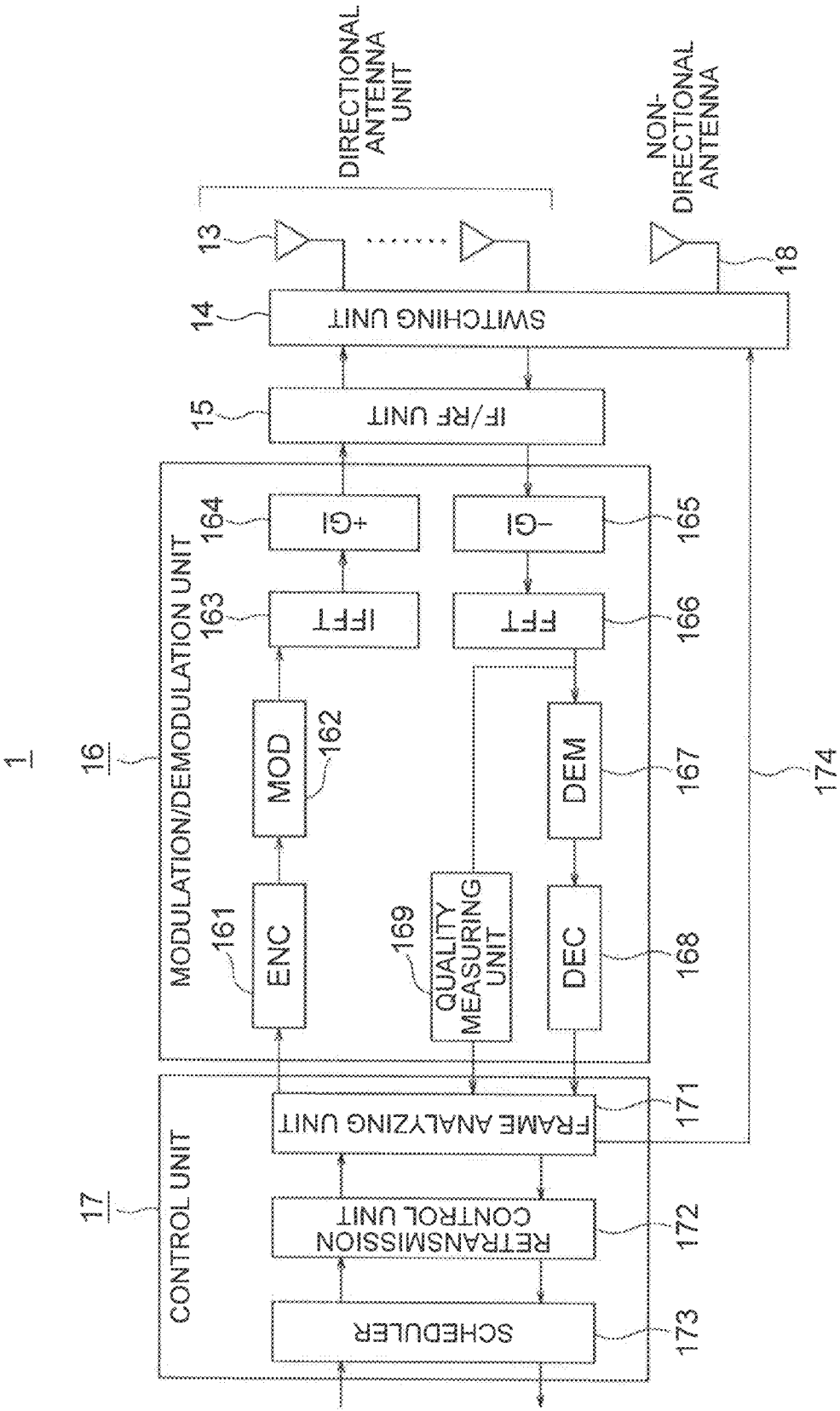

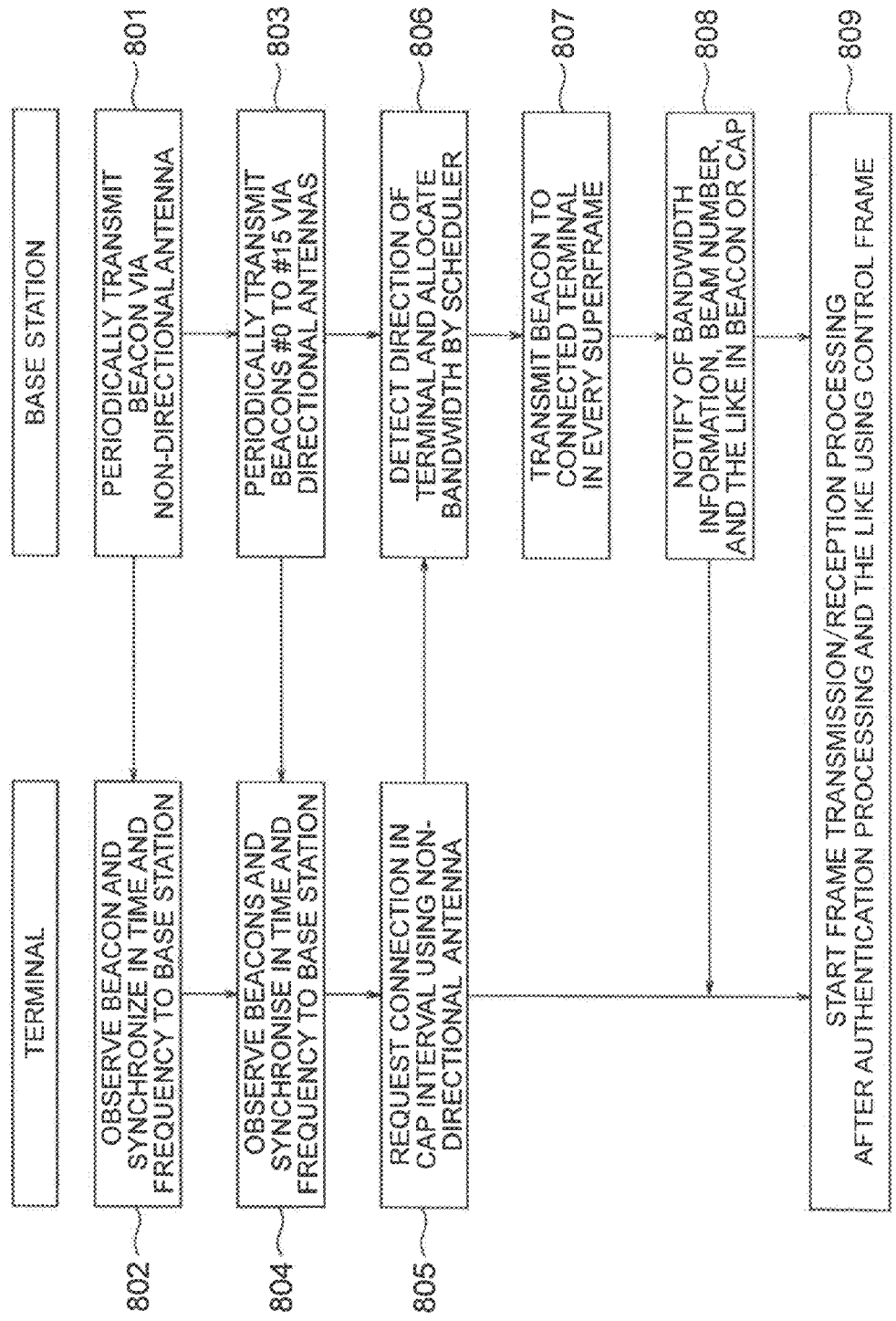

RADIO COMMUNICATION SYSTEM AND RADIO COMMUNICATION METHOD

TECHNICAL FIELD

The present invention relates to a radio communication system and a radio communication method for conducting a communication between a base station and a plurality of terminals by wireless, and more particularly, to a radio communication system and a radio communication method, in which the base station has a plurality of directional antennas, and a communication time is ensured for only a specific area where the terminal exists.

BACKGROUND ART

Conventional antennas used in a wireless local area network (LAN) system or a ultra wide band (UWB) radio system depend on the characteristics of a frequency band used in that system, and have the directional property of a relatively wide angle. For that reason, those antennas also have a wide range of available applications and acceptable environments, and are expected to become widespread in the future. However, a demand for the increased transmission rate of a radio communication has been more and more increasing in the recent years, and a radio communication system using a millimeter waveband or the like which is capable of ensuring a further ultra wide band has been studied (IEEE 802.15.3c).

The millimeter waveband has such advantages that the linear property is high, and an influence of interference is low, as well as an advantage of being capable of ensuring confidentiality, as compared with a microwave band. Up to now, the millimeter waveband has been used in some fields including communications among buildings, a video transmission system for a home television, or the like, as an alternative to a wire communication, and "ARIB STD-T69", "ARIB STD-T74", or the like has been established as a standard.

There has been proposed a conventional radio communication systems, which has a control station with a plurality of antennas, and a plurality of terminal station (for example, refer to Patent Document 1). On a control station side of the conventional radio communication system, signals from the plurality of terminal stations are sequentially received by the plurality of antennas, the qualities of the signals received by the respective antennas are measured, and an antenna that has received a signal highest in quality is used for a communication with the terminal stations.
Patent Document 1: JP 7-135675 A

DISCLOSURE OF THE INVENTION

Problem to be Solved by the Invention

However, in general, there arises such a problem that because the millimeter waveband is larger in attenuation of a wireless power in a space than the microwave band or the like, a communication area is limited, and the use environment and application are limited.

Besides, in the above-mentioned conventional radio communication system, the higher transmission rate, the securing of confidentiality, or the like has not been intended.

The present invention has been made to solve the above-mentioned problem, and therefore an object of the present invention is to obtain a radio communication system and a radio communication method which are capable of realizing an effective communication in a wide area while ensuring the higher transmission rate and the confidentiality.

Means for Solving the Problem

A radio communication system according to the present invention is a radio communication system that conducts a communication between a base station and a plurality of terminals wirelessly, in which the base station includes a multiple-beam antenna made up of a plurality of antennas, and emits radio waves having the same frequency at the same timing from the multiple-beam antenna toward a plurality of specific areas corresponding to the plurality of antennas without overlapping by time division to form a plurality of spot beams, in which frames to which communication channels are allocated between the base station and the terminals each include a plurality of beacon channels which are channels from the base station to all of the terminals and are allocated for each of the antennas, a plurality of request channels which are channels from all of the terminals to the base station and are allocated for each of the antennas, and a downlink channel and an uplink channel allocated to a request terminal, in which the base station transmits broadcast information including information for identifying the antenna from each of the antennas through the plurality of beacon channels, in which when a terminal that exists in any one of the plurality of specific areas receives the broadcast information through the beacon channel, the terminal selects an optimum beacon channel, and transmits a communication establishment request including information for identifying the antenna and a bandwidth request including a desired communication bandwidth to the base station through a request channel which, among the plurality of request channels, corresponds to the information for identifying the antenna, which is included in the broadcast information received through the selected optimum beacon channel, and in which when the base station receives the communication establishment request and the bandwidth request through the request channel, the base station determines whether or not a channel is to be allocated to the frame for the request terminal, and when the channel is allocated, the base station schedules a modulation scheme and an encoding scheme for communicating with the request terminal, and a channel allocation time including the downlink data channel and the uplink data channel.

Effects of the Invention

The radio communication system according to the present invention has an advantage that the effective communication in a wide area can be realized while ensuring the higher transmission rate and the confidentiality.

BRIEF DESCRIPTION OF THE DRAWINGS

FIG. 12 is a diagram illustrating a configuration example of a MAC header in the radio communication system according to the fourth embodiment of the present invention.

FIG. 13 is a diagram illustrating another configuration example of the MAC header in the radio communication system according to the fourth embodiment of the present invention.

FIG. 15 is a diagram illustrating a BCCH information element that is transmitted by a beacon frame in the radio communication system according to the fifth embodiment of the present invention.

FIG. 16 is a diagram illustrating an information element of FCH in the radio communication system according to the fifth embodiment of the present invention.

FIG. 17 is a diagram illustrating a configuration of a frame in a radio communication system according to a sixth embodiment of the present invention.

FIG. 18 is a block diagram illustrating a configuration of a base station in a radio communication system according to a seventh embodiment of the present invention.

FIG. 22 is a flowchart illustrating a procedure of connecting a terminal to a base station in the radio communication system according to the eighth embodiment of the present invention.

BEST MODE FOR CARRYING OUT THE INVENTION

First to eighth embodiments of the present invention are described below.

First Embodiment

Figure 1:
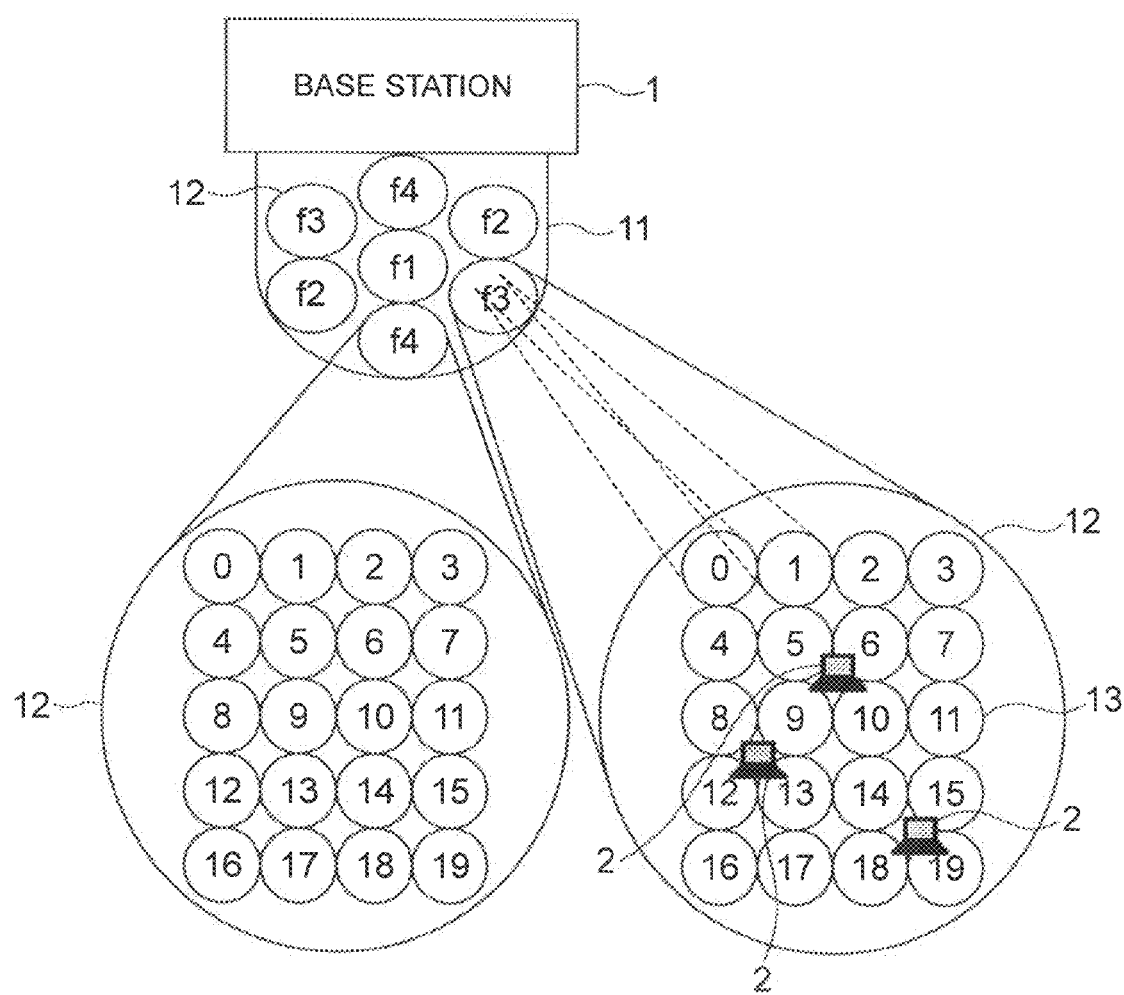
FIG. 1 is a diagram illustrating a configuration of a radio communication system according to a first embodiment of the present invention.

A radio communication system according to a first embodiment of the present invention are described with reference to FIGS. 1 to 7 and 10. FIG. 1 is a diagram illustrating a configuration of the radio communication system according to the first embodiment of the present invention. In the following description, the same references in the respective drawings denote identical or corresponding parts.

Referring to FIG. 1, the radio communication system according to the first embodiment includes a base station 1, and a plurality of (for example, three) terminals 2. The base station 1 is disposed, for example, on a ceiling in a building, and the terminals 2 such as a personal computer having an antenna, or the like are disposed on a floor in the building. A spatial arrangement of the base station 1 and the terminals 2 is not limited thereto. The base station 1 may be disposed on a side wall in the building. Further, both may be reversed up and down. The base station 1 may be disposed, for example, on the floor in the building, and the terminals 2 may be disposed on the ceiling in the building. Further, the spatial arrangement of the base station 1 and the terminals 2 is not limited to the interior in the building, but is free within an arrival range of the radio wave.

A multiple-beam antenna 11 disposed within the base station 1 is made up of a plurality of (for example, seven) sectors 12, and each of the sectors 12 emits radio waves of an identical frequency (for example, millimeter wavebands) from a plurality of antenna elements 13, respectively. The frequencies emitted from the plurality of antenna elements 13 within one sector 12 are identical with each other, and are not emitted in an overlapping manner at the same timing. In the example of FIG. 1, a central sector 12 uses a frequency f1, a sector 12 disposed above the central sector 12 uses a frequency f4, and five sectors 12 disposed clockwise use frequencies f2, f3, f4, f2, and f3 in order. That is, the adjacent sectors 12 use different frequencies, and the sectors 12 opposite to each other use the same frequency. Besides, one base station 1 covers a given radio communication area.

In FIG. 1, the number of antenna elements 13 that constitute one sector 12 is "20" (antenna element numbers 0 to 19), and hence twenty antenna elements 13 emit spot beams toward respective specific areas defined by the respective antenna elements at different timings, respectively. Each of the terminals 2 communicates with the base station 1 through the antenna elements 13 when the terminal 2 exists in any specific area which is emitted with the spot beam through each of the antenna elements 13 of the base station 1. The number of antenna elements 13 that constitute one sector 12 is not limited to 20, but may be 10 or 50, and is free. Further, the antenna elements 13 may be of a plurality of antenna elements, or may constitute the sector 12 with the use of an adaptive array antenna or the like as long as a radio wave can be emitted toward a specific area.

Figure 2:
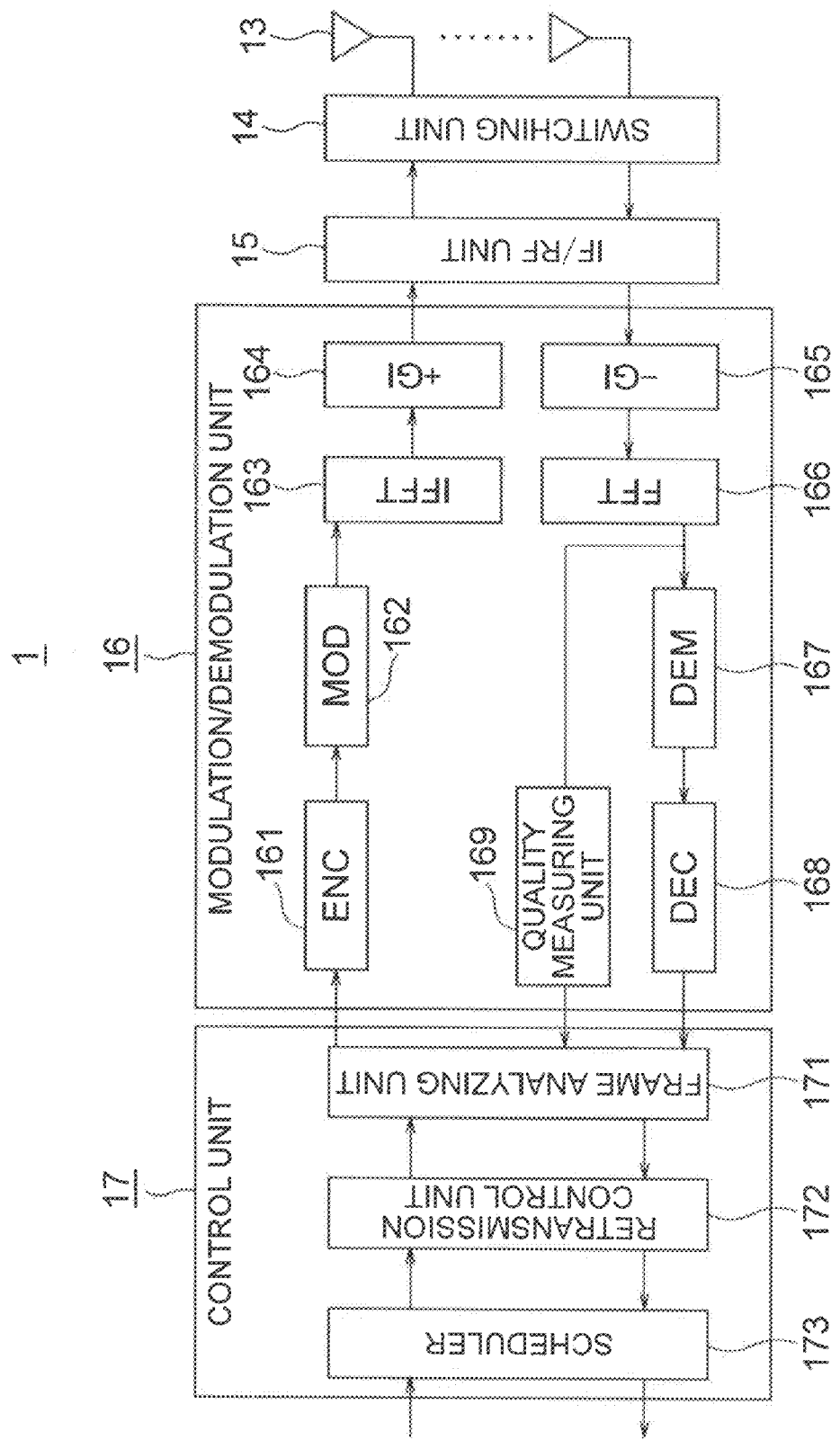
FIG. 2 is a block diagram illustrating a configuration of a base station in the radio communication system according to the first embodiment of the present invention.

FIG. 2 is a block diagram illustrating a configuration of the base station in the radio communication system according to the first embodiment of the present invention.

Referring to FIG. 2, the base station 1 includes a plurality of (for example, 7×20=140) directional antenna elements 13 that constitute the multiple-beam antenna 11, a switching unit 14, an IF/RF unit 15, a modulation/demodulation unit 16, and a control unit 17.

Besides, the modulation/demodulation unit 16 includes an encoder (ENC) 161, a modulator (MOD) 162, an inverse fast Fourier transform (IFFT) unit 163, a guard interval (+GI) adding unit 164, a guard interval (−GI) removing unit 165, a fast Fourier transform (FFT) unit 166, a demodulator (DEM) 167, a decoder (DEC) 168, and a quality measuring unit 169.

Further, the control unit 17 includes a frame analyzing unit 171, a retransmission control unit 172, and a scheduler 173.

As illustrated in FIG. 2, the plurality of antenna elements 13 are connected to the switching unit 14. The switching unit 14 changes over so as to be connected to the respective antenna elements 13 for only a required connection time and connection interval. The IF/RF unit 15 is connected to the modulation/demodulation unit 16, and converts a transmission digital signal from the modulation/demodulation unit 16 into an analog signal to up-convert the signal from an IF frequency into an RF frequency. Besides, the IF/RF unit 15 down-converts a received signal from the switching unit 14 into the IF frequency from the RF frequency, converts the signal into a digital signal, and outputs the received digital signal to the modulation/demodulation unit 16.

Besides, the modulation/demodulation unit 16 conducts digital radio signal processing. In a modulation part in the modulation/demodulation unit 16, the encoder (ENC) 161 conducts error correction processing on a transmission packet input from the control unit 17, and the modulator (MOD) 162 conducts I-Q mapping processing according to a modulation frequency. The inverse fast Fourier transform unit (IFFT) 163 and the guard interval adding unit (+GI) 164 conduct orthogonal frequency division multiplexing (OFDM) modulation processing.

A demodulation part in the modulation/demodulation unit 16 conducts the orthogonal frequency division multiplexing (OFDM) demodulation processing on the received digital signal input from the IF/RF unit 15 by means of the guard interval removing unit (−GI) 165 and the fast Fourier transform (FFT) unit 166. The demodulator (DEM) 167 conducts I-Q demapping processing. The decoder (DEC) 168 executes decoding processing, and outputs a received packet to the control unit 17. In the demodulation/modulation unit 16, the radio modulation/demodulation scheme is exemplified by the orthogonal frequency division multiplexing (OFDM). However, the radio communication system according to the present invention can be of a modulation scheme of multiple carriers such as orthogonal frequency division multiple access (OFDMA) or multi-carrier code division multiple access (MC-CDMA), or may be of a modulation scheme of a single carrier such as a frequency shift keying (FSK), amplitude shift keying (ASK), or quadrature amplitude modulation (QAM), and does not depend on the radio modulation/demodulation scheme. Further, a spatial multiplexing transmission technology using a plurality of antennas such as a multiple input multiple output (MIMO) may be combined with the above-mentioned system.

Further, the quality measuring unit 169 measures a radio link quality such as a received signal strength indicator (RSSI) of the received signal from the terminal 2 or a carrier to noise power ratio (CNR) with the aid of the received digital signal, and outputs the measurement signal to the control unit 17.

The control unit 17 transmits a transmission packet from a network or an application to the modulation/demodulation unit 16, and receives a reception packet from the modulation/demodulation unit 16. The frame analyzing unit 171 generates and analyzes the packet, and the retransmission control unit 172 executes packet retransmission processing when an error occurs in the radio line. The scheduler 173 controls the bandwidth (region) allocation of a downlink/uplink within the frame according to a bandwidth request from the terminal 2, the radio link quality, the quality of service (QoS), and a traffic condition.

Besides, the scheduler 173 manages a connection time and a connection interval of the respective antenna elements 13 with respect to the switching unit 14. That is, the scheduler 173 gives an instruction on the connection time and the connection interval of the respective antenna elements 13 to the switching unit 14 through the modulation/demodulation unit 16 and the IF/RF unit 15 so as to periodically transmit and receive the beacon channel (beacon ch) and the request channel (request ch), respectively. In the case of receiving a communication establishment request from the terminal 2 through a request channel, the scheduler 173 determines whether or not a channel is allocated to a frame having a fixed length taking a bandwidth request from the terminal 2 through the request channel, the radio link quality of the terminal 2 which has been measured by the quality measuring unit 169, the quality of service according to the application, a total traffic condition of the radio communication area which is managed by the base station 1, and so on into consideration. When it is determined that the channel is allocated, the scheduler 173 notifies the terminal 2 of the presence/absence of the channel allocation, the bandwidth quantity (region quantity) of the downlink/uplink, a position in the frame (specified by a time from reference data (for example, leading data) or the number of symbols), the modulation scheme, the encoding scheme (encoding ratio), or the like as a channel configuration through the beacon channel (beacon ch) and a frame control header (FCH).

Figure 3:
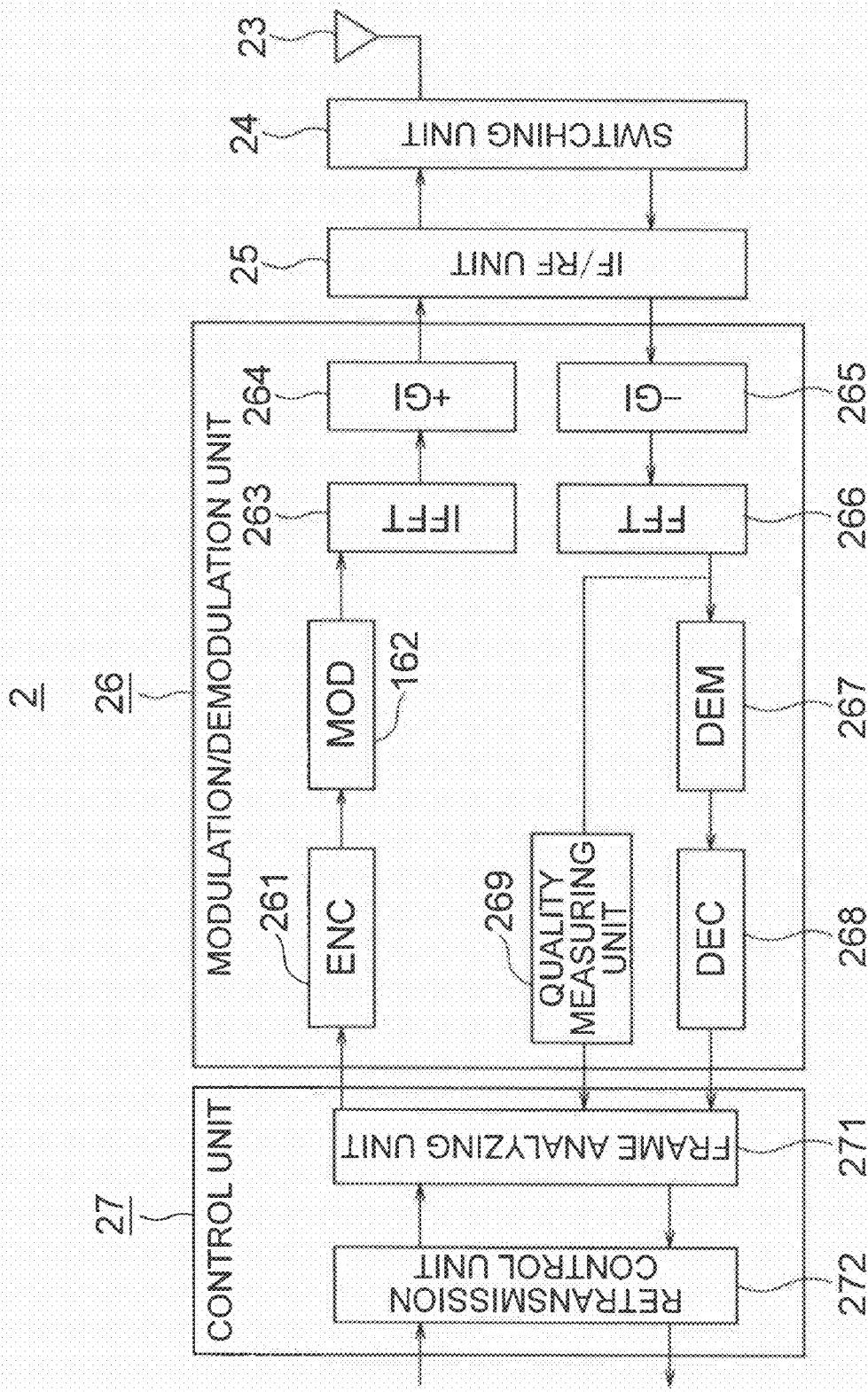
FIG. 3 is a block diagram illustrating a configuration of a terminal in the radio communication system according to the first embodiment of the present invention.

FIG. 3 is a block diagram illustrating a configuration of the terminal in the radio communication system according to the first embodiment of the present invention.

FIG. 3 is for describing the block configuration of the terminal 2, and components identical with those in the block diagram of the base station of FIG. 2 are given only names of the block configurations, and the descriptions of their functions and operations are omitted.

An antenna 23 is made up of a single antenna element, and a switching unit 24 changes over between the transmission connection time and the reception connection time of the antenna 23. A control unit 27 has no scheduler. The antenna 23 may be made up of sectors that conduct emission from a plurality of antenna elements as in FIG. 2.

In the terminal 2, downlink data is input to a modulation/demodulation unit 26 as a received digital signal through the antenna 23, the switching unit 24, and an IF/RF unit 25. The modulation/demodulation unit 26 conducts demodulation processing and decoding processing, and measures the quality of the received signal by means of a quality measuring unit 269.

That is, referring to FIG. 3, the terminal 2 includes the antenna 23, the switching unit 24, the IF/RF unit 25, the modulation/demodulation unit 26, and the control unit 27.

Besides, the modulation/demodulation unit 26 includes an encoder (ENC) 261, a modulator (MOD) 262, an inverse fast Fourier transform (IFFT) unit 263, a guard interval (+GI) adding unit 264, a guard interval (−GI) removing unit 265, a fast Fourier transform (FFT) unit 266, a demodulator (DEM) 267, a decoder (DEC) 268, and the quality measuring unit 269.

Further, the control unit 27 includes a frame analyzing unit 271 and a retransmission control unit 272.

Figure 4:
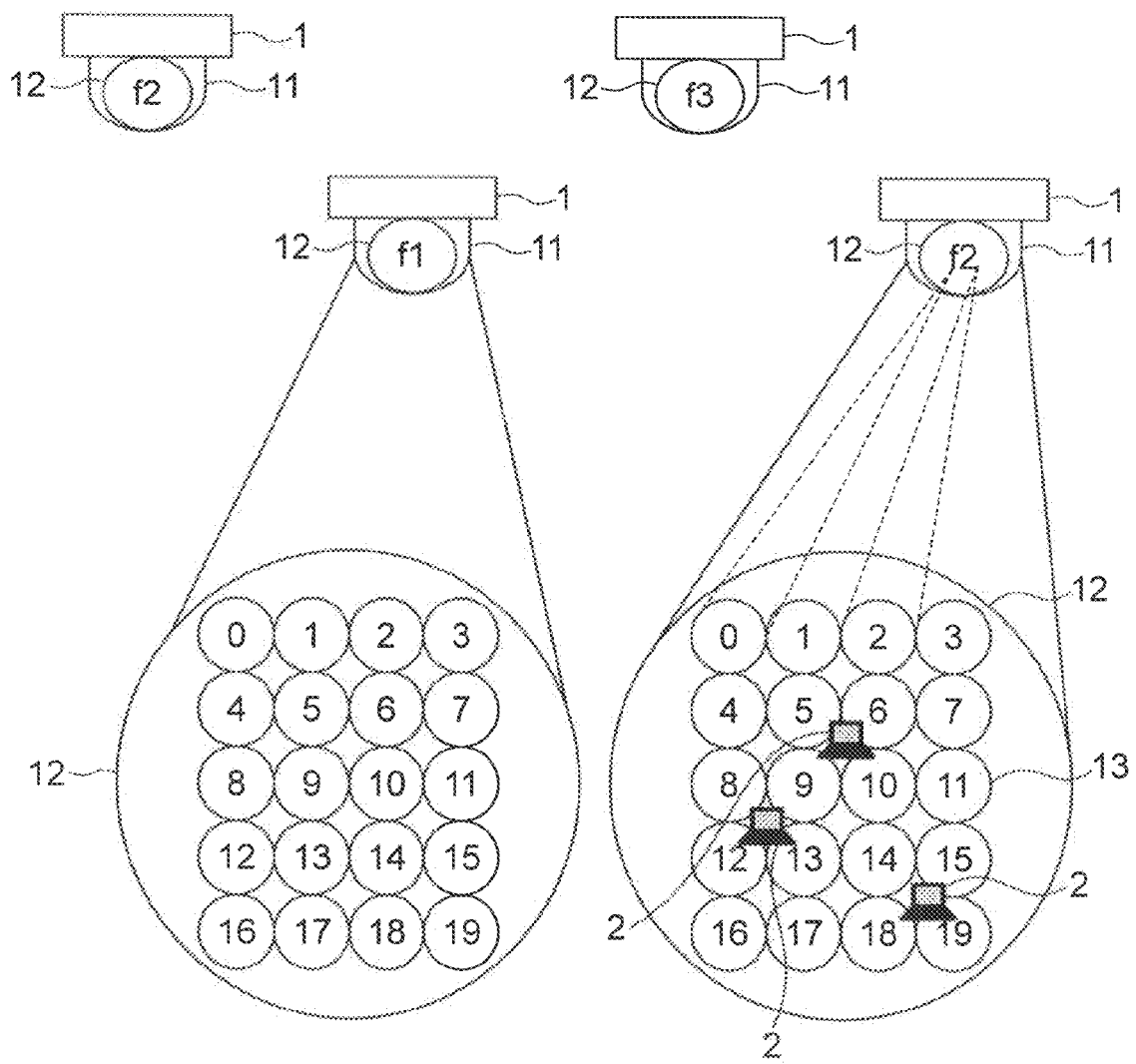
FIG. 4 is a diagram illustrating another configuration of the radio communication system according to the first embodiment of the present invention.

FIG. 4 is a diagram illustrating another configuration of the radio communication system according to the first embodiment of the present invention. In FIG. 1, the multiple-beam antenna 11 disposed in the base station 1 is made up of the seven sectors 12. However, in FIG. 4, a multiple-beam antenna 11 disposed in the base station 1 is made up of one sector 12, and a plurality of (for example, seven) base stations 1 may be so disposed as to cover the same radio communication area as that of FIG. 1. The plurality of base stations 1 may be connected to each other by wires or wirelessly.

Subsequently, a description is given of the operation of the radio communication system according to the first embodiment with reference to the drawings.

Figure 5:
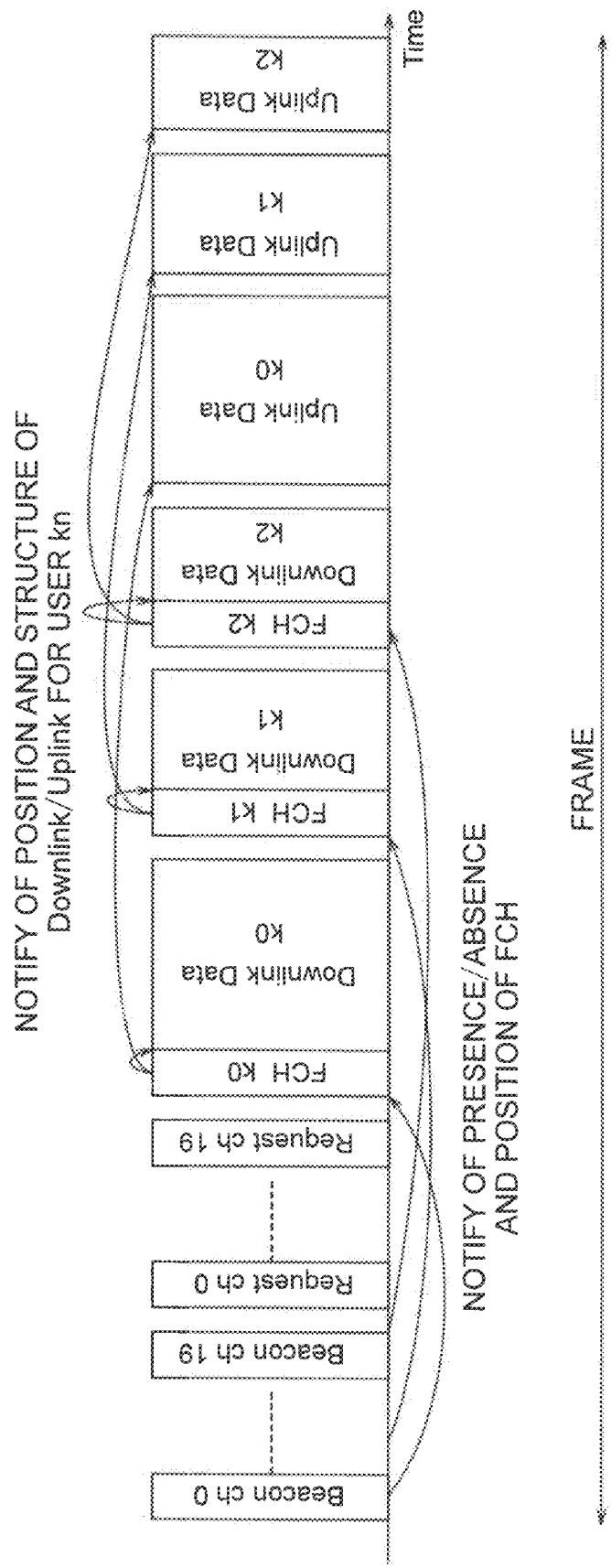
FIG. 5 is a diagram illustrating a configuration of a frame in the radio communication system according to the first embodiment of the present invention.

FIG. 5 is a diagram illustrating a configuration of a frame in the radio communication system according to the first embodiment of the present invention. Referring to FIG. 5, beacon channels (beacon chs 0 to 19) are channels that emit respective broadcast information from the respective antenna elements 13 of the base station 1, and include information for identifying the respective antenna elements 13, such as a base station number, a sector number, or an antenna element number. Besides, request channels (request chs 0 to 19) are channels for making a communication establishment request for establishing a communication, and a bandwidth request to the base station 1 from the terminal 2. The terminal 2 receives the beacon channels emitted from the respective antenna elements 13 of the base station 1, to thereby select an optimum beacon channel and make the communication establishment request or the bandwidth request by request channel number corresponding to the optimum beacon channel number. The above-mentioned frame is of a fixed length, but may be of a variable length.

As a method of selecting the optimum beacon channel, there are proposed a method based on radio link quality information such as the received signal strength indicator (RSSI) of the respective beacon channels or the carrier to noise power ratio (CNR), a method based on a correlation detection result on the terminal 2 side by using known information such as preamble or pilot, and so on.

FIG. 5 illustrates an example of a frame corresponding to the sector (frequency f3 is used) 12 indicated at the bottom right of FIG. 1, and also in other six sectors 12, a communication is conducted between the base station 1 and the terminals 2 in the same frame alongside. That is, in the example of FIG. 1, communications are conducted between the base station 1 and the terminals 2 in seven frames corresponding to seven sectors 12 at the same time, respectively.

When the beacon channel and the request channel are of the fixed length, a correspondence relationship of the channel numbers between the beacon channels and the request channels becomes clear. That is, when the terminal 2 transmits a desired request channel number at a desired timing, it is found that the base station 1 is a request channel corresponding to the beacon channel of which antenna element 13. In this case, the terminal 2 transmits information for specifying the terminal 2 per se and the antenna element number together in the request channel. The timing information of the corresponding request channel is included in the beacon channel, thereby making it possible to make the beacon channel and the request channel variable in length.

The base station 1 that has received the communication establishment request including the antenna element number from the terminal 2 through the request channel determines the connection time and the connection interval of the antenna element 13 based on the quality of service, a desired bandwidth, the communication time, or the like, which is requested by the respective terminals 2, and determines a channel allocation time for communicating with the respective terminals 2 from which the request has been received, respectively. Besides, the base station 1 determines the modulation scheme and the encoding scheme (encoding ratio) based on the radio link quality such as the received signal strength indicator (RSSI) of the request channel received from the terminal 2 or the carrier to noise power ratio (CNR), the requested bandwidth, QoS, the traffic condition, or the like, and determines the channel allocation time.

The base station 1 makes notification of the connection time of the respective antenna elements 13 for conducting a radio communication, that is, the channel allocation time to the respective terminals 2, to the respective terminals 2 through a frame control header (FCH). That is, upon receiving the frame control header (FCH), the respective terminal 2 can grasp whether or not the communication establishment request of the terminals per se has been permitted, and at the same time, can grasp information indicative of bandwidths of downlink and uplink allocated to the terminals per se, the modulation scheme, and the encoding scheme. Besides, the base station 1 determines the connection time and the connection interval with respect to the respective antenna elements 13 which are controlled by the base station 1 per se based on the notified information.

FIG. 5 illustrates an example in which downlink data bandwidth (region) and uplink data bandwidth (region) are allocated to totally three terminals (users) k0, k1, and k2, respectively. That is, in the data region including the frame control header (FCH), there is used only the antenna element 13 that forms a spot beam of a specific area in which the terminals k0, k1, and k3 exist.

Figure 6:
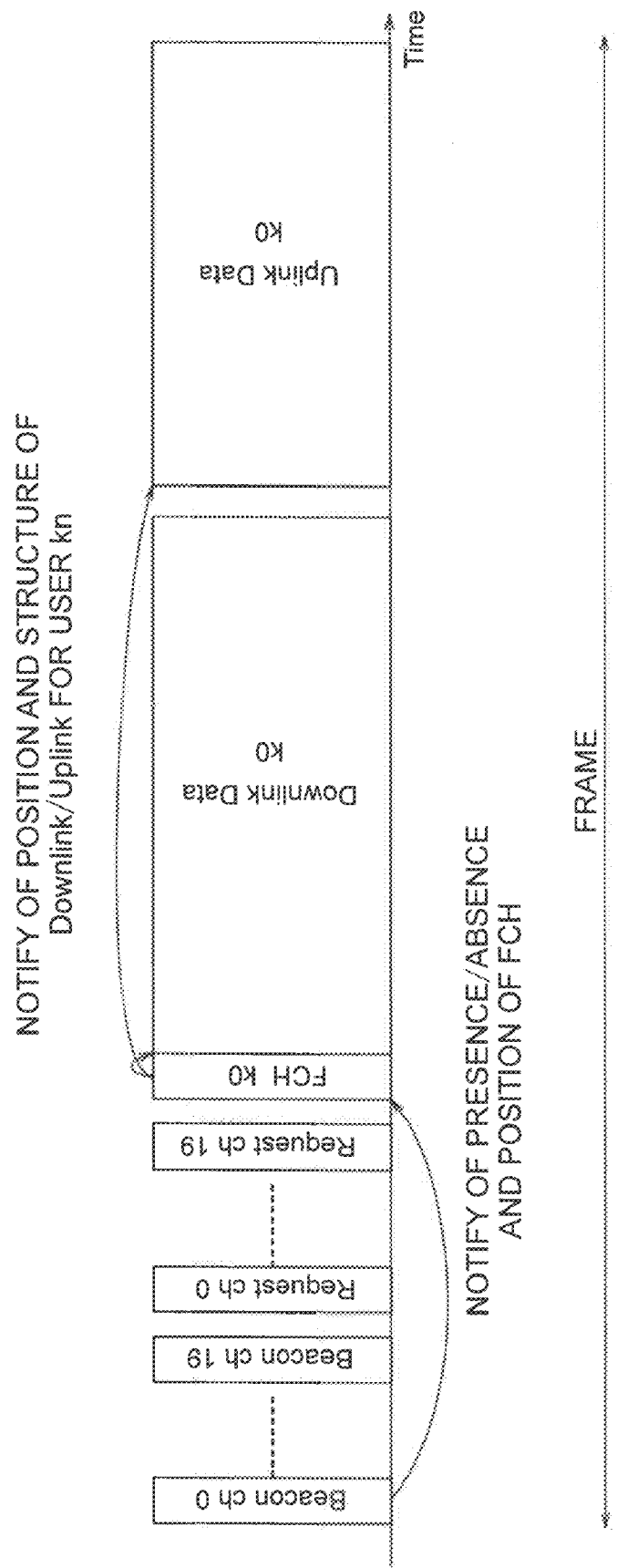
FIG. 6 is a diagram illustrating another configuration of the frame in the radio communication system according to the first embodiment of the present invention.

FIG. 6 is a diagram illustrating another configuration of the frame in the radio communication system according to the first embodiment of the present invention. FIG. 5 illustrates the allocation of downlink data bandwidths (regions) and uplink data bandwidths (regions) for the three terminals k0, k1, and k2. However, as illustrated in FIG. 6, when the number of existing terminals is one, the data bandwidth (region) of one frame can be occupied in one terminal k0. Besides, in FIGS. 5 and 6, the number of uplink data channels and the number of downlink data channels which are allocated to each terminal are one, respectively, but the frame configuration may not be limited to this. For example, in FIG. 5, the respective channels allocated to the terminals k0, k1, and k2 can be further divided and repetitively allocated.

The duplex system according to the first embodiment is exemplified by the time division duplex (TDD). However, the radio communication system according to the first embodiment may use a frequency division duplex (FDD). Further, the multiple access system according to the first embodiment is exemplified by the time division multiple access (TDMA). However, the radio communication system according to the first embodiment can employ the frequency division multiple access (FDMA), the code division multiple access, the carrier sense multiple access with collision avoidance (CSMA/CA), or the like, or can employ the combination of those accesses regardless of whether or not to be within the same super frame.

Figure 7:
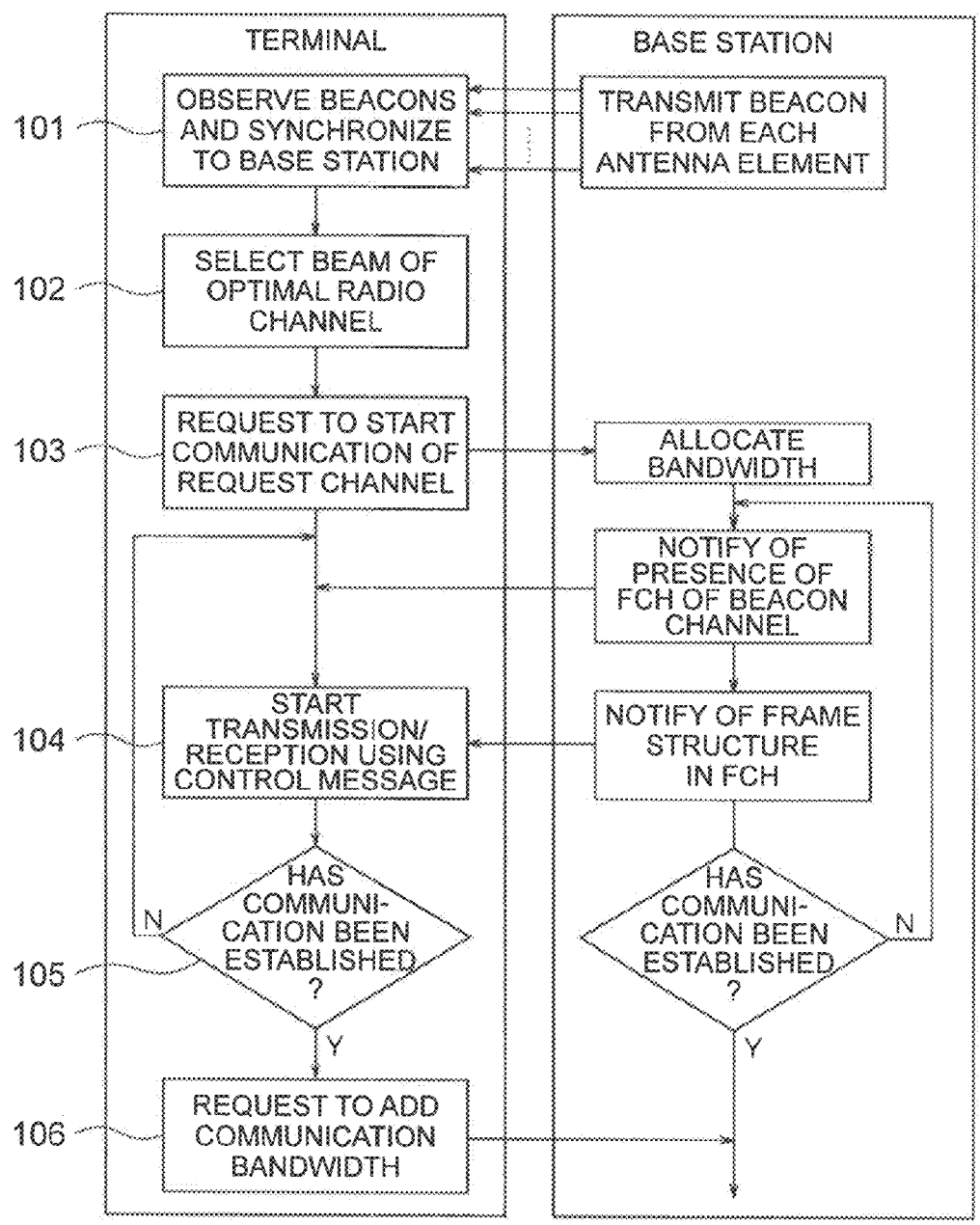
FIG. 7 is a flowchart illustrating a procedure of connecting the terminal to the base station in the radio communication system according to the first embodiment of the present invention.

FIG. 7 is a flowchart illustrating a procedure of connecting the terminal to the base station in the radio communication system according to the first embodiment of the present invention.

In Steps 101 and 102, the terminal 2 receives broadcast information through the beacon channel periodically transmitted from the base station 1 by time division. The beacon channel is transmitted from the respective antenna elements 13 by means of the scheduler 173 of the base station 1. In the terminal 2, the modulation/demodulation unit 26 synchronizes the frequency and time of the terminal 2 per se with those of a desired base station 1 by means of a preamble portion (not shown) of the received beacon channel. Besides, the terminal 2 selects a spot beam of the optimum beacon channel by means of the frame analyzing unit 271. That is, the terminal 2 selects the antenna element 13 to which the beacon channel that has observed the optimum radio link quality has been transmitted.

Figure 10:
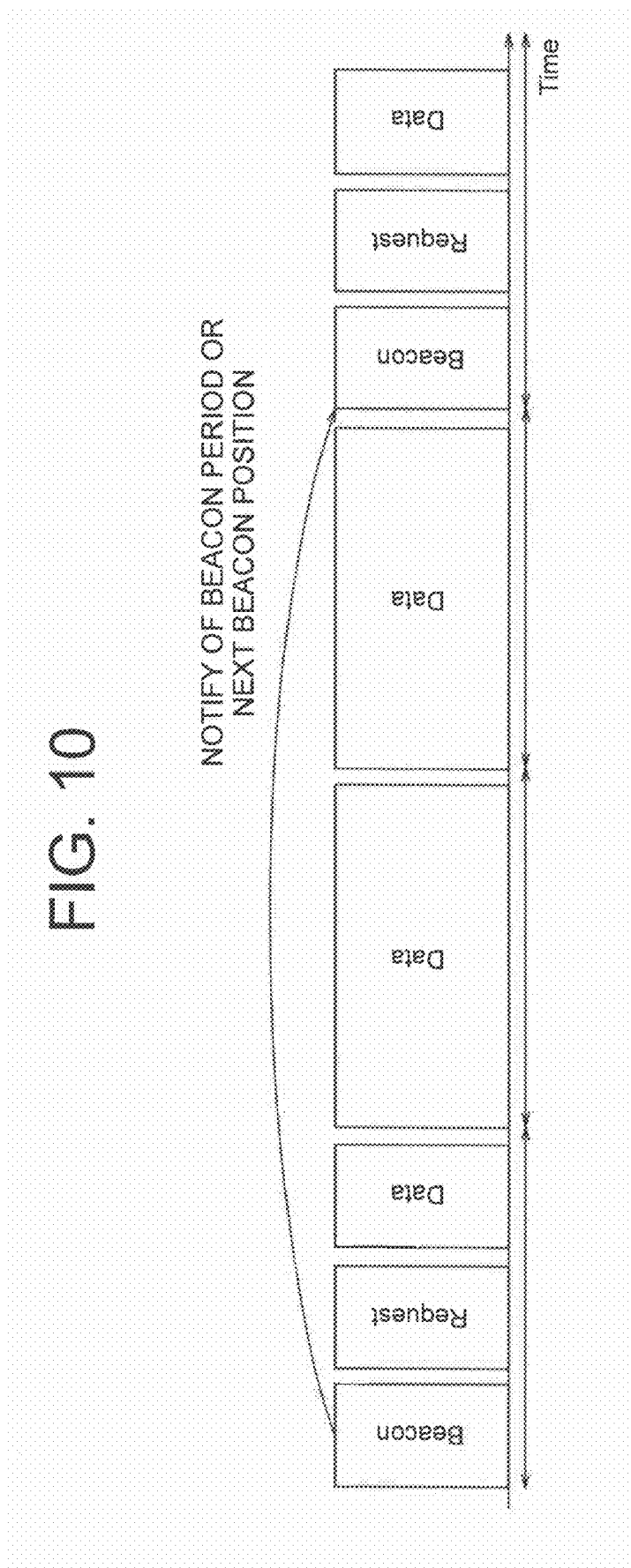
FIG. 10 is a diagram illustrating still another configuration of the frame in the radio communication system according to the first embodiment of the present invention.

Subsequently, in Step 103, in the terminal 2, the frame analyzing unit 271 conducts a communication establishment request on the desired base station 1 by means of a request channel corresponding to the antenna element number of the selected antenna element 13. In this situation, the terminal 2 requests a desired communication bandwidth together, that is, conducts a bandwidth request. The broadcast information transmitted through the beacon channel includes information for identifying the respective antenna elements 13, such as a base station number, a sector number, or an antenna element number, and the respective beacon channels and the respective request channels are associated with each other in each of the antenna element numbers FIG. 10 is a diagram illustrating still another configuration of the frame in the radio communication system according to the first embodiment of the present invention. In this example, as illustrated in FIG. 10, if the cycles of the beacon channel and the request channel are notified by, for example, a previous beacon channel, and timing at which transmission is next made can be determined by the terminal 2, it is not always necessary to exist in every frame.

When the base station 1 receives the communication establishment request and the bandwidth request from the terminal 2 through the request channel, the base station 1 determines whether or not the channel is allocated to the request terminal by means of the scheduler 173 on the basis of the communication bandwidth requested by the terminal 2, the radio link quality of the request terminal, QoS, the total traffic quantity of other terminals from which the communication establishment request and the bandwidth request are currently received, or the like. If determined to allocate, the scheduler 173 schedules how much bandwidth is allocated to the downlink and the uplink, respectively.

When the scheduler 173 determines that the channel is allocated to the request terminal, the scheduler 173 notifies the request terminal of information indicative of the presence/absence of the frame control header (FCH) and a position in the frame through the beacon channel. The scheduler 173 notifies the frame control header (FCH) of the bandwidth quantity of the downlink/uplink for the request terminal, and the position in the frame. In this situation, the scheduler 173 can make notification of information on the radio modulation system and whether or not the frame is the retransmission frame at the same time.

Then, in Step 104, the terminal 2 receives and transmits the downlink and uplink of the frame by means of the frame analyzing unit 271, respectively, and exchanges a control message necessary for a logic communication access with the base station 1, to thereby complete the logic communication access, and be ready for receiving and transmitting data required by each other.

In Step 105, the operation in Step 104 is repeated until the communication establishment has been completed. That is, the terminal 2 exchanges the control message necessary for the logic communication access with the base station 1.

In Step 106, the terminal 2 can conduct the bandwidth request for addition or deletion of the communication bandwidth on the base station 1 with the aid of the request channel by means of the frame analyzing unit 271 after the communication has been established.

As described above, in the base station 1 including the multiple-beam antenna 11 that emits the radio waves of the same frequency from the plurality of antenna elements 13, the spot beam is emitted from each antenna element 13 toward each specific area defined by each antenna element 13 by time division, that is, without overlapping each other at the same timing. Then, the relationship between the terminal 2 that exists in each specific area and each antenna element 13 is associated with each other. As a result, only the antenna element 13 that emits the spot beam of the specific area in which the terminal 2 exists is used to enable communication. Hence, it is possible to increase the frequency use efficiency, and it is possible to reduce the power consumption.

Besides, only the antenna element 13 that emits the spot beam of the specific area in which the terminal 2 exists is used to emit the spot beam from the base station 1, and hence it is possible to ensure confidentiality.

Further, only the antenna element 13 that emits the spot beam of the specific area in which the terminal 2 exists is used to emit the spot beam from the base station 1. Hence, it is possible to reduce emission of unnecessary radio waves toward others, that is, reduce an interference wave, and it is possible to enlarge a communication area and increase the transmission speed.

The first embodiment describes the configuration of the radio communication system assuming the millimeter waveband having the property of high linearity as a physical characteristic. Further, the first embodiment can be used in the radio communication system using a terahertz band high in frequency, or the like, or can be applied to a case where a directional antenna or the like is used in the radio communication system using the microwave band or the like.

Second Embodiment

Figure 8:
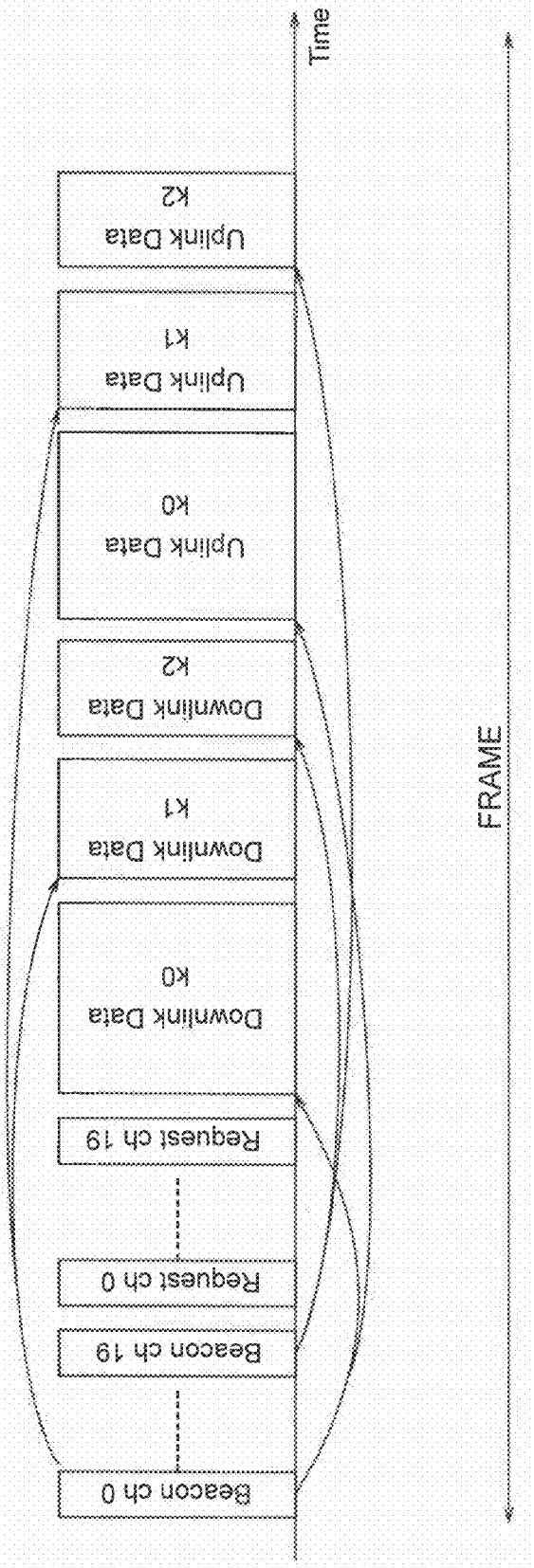
FIG. 8 is a diagram illustrating a configuration of a frame in a radio communication system according to a second embodiment of the present invention.

A radio communication system according to a second embodiment of the present invention is described with reference to FIG. 8. FIG. 8 is a diagram illustrating a configuration of a frame in a radio communication system according to the second embodiment of the present invention. A configuration of the radio communication system according to the second embodiment is identical with that in the above-mentioned first embodiment.

The base station 1 that has received a communication establishment request from the terminal 2 through the request channel (request ch) including the antenna element number determines the connection time and the connection interval of the antenna element 13 based on the quality of service, a desired bandwidth, the communication time, or the like, which is requested by the respective terminals 2, and determines a channel allocation time for communicating with the respective terminals 2 from which the request has been received, respectively. Besides, the base station 1 determines the modulation scheme and the encoding scheme (encoding ratio) based on the radio link quality such as the received signal strength indicator (RSSI) of the request channel received from the terminal 2 or the carrier to noise power ratio (CNR), the requested bandwidth, QoS, the traffic condition, or the like, and determines the channel allocation time.

The base station 1 makes notification of the connection time of the respective antenna elements 13 for conducting a radio communication, that is, the channel allocation time to the respective terminals 2, to the respective terminals 2 through the beacon channels (beacon chs) corresponding to the respective antenna elements 13 as in FIG. 8. That is, upon receiving the beacon channels, the respective terminals 2 can not only obtain information for identifying the respective antenna elements 13, such as abase station number, a sector number, and an antenna element number, but also grasp whether or not the communication establishment request of the terminals per se has been permitted, and at the same time, can grasp information indicative of bandwidths of downlink and uplink allocated to the terminals per se, the modulation scheme, and the encoding scheme. Besides, the base station 1 determines the connection time and the connection interval with respect to the respective antenna elements 13 which are controlled by the base station 1 per se based on the notified information.

As described above, the channel allocation time indicative of bandwidths of the downlink and uplink, the modulation scheme, and the encoding scheme, which is notified to the respective terminals 2 by the base station 1, is combined with the broadcast information, thereby enabling the efficient use of the frame, and also enabling relaxation of a request for the hardware and software processing delay of the terminals 2.

Third Embodiment

Figure 9A:
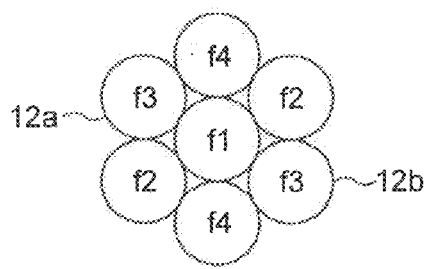
FIGS. 9A-9C are diagrams illustrating an example in which interference occurs between sectors in a radio communication system according to a third embodiment of the present invention.
Figure 9B:
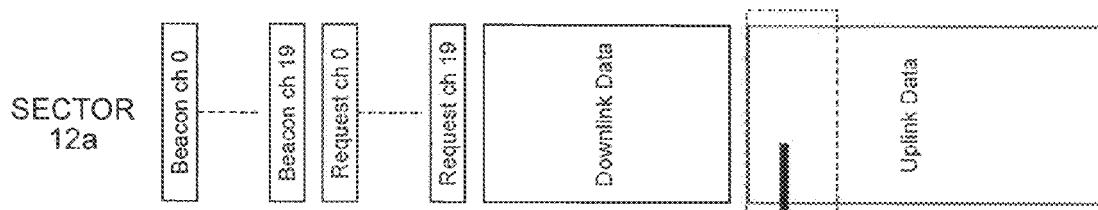
Figure 9C:
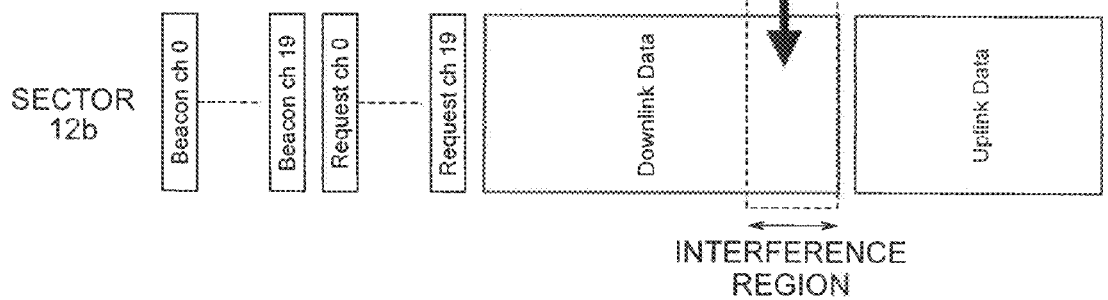

A radio communication system according to a third embodiment of the present invention is described with reference to FIGS. 9A-9C. FIGS. 9A-9C are diagrams illustrating an example in which interference occurs between sectors in the radio communication system according to the third embodiment of the present invention. A configuration of the radio communication system according to the third embodiment is identical with that in the above-mentioned first embodiment.

As illustrated in FIG. 1, when the multiple-beam antenna 11 has the sector configuration, the same frequency within the same radio communication area is repetitively used to develop two-dimensionally, thereby enabling a wider area to be formed. In this case, when the directivity of the antenna 23 used for the terminal 2 is wide, even though the sectors are spaced apart from each other, interference may occur between the sectors.

FIG. 9A illustrates a configuration of seven sectors in the multiple-beam antenna 11, and FIGS. 9B and 9C illustrate a configuration of the respective frames in sectors 12*a* and 12*b*.

As illustrated in FIG. 9A, in the case where the same frequency f3 is used in the sector 12*a* and the sector 12*b* which are spaced apart from each other, when the respective sectors 12*a* and 12*b* have the frame configurations illustrated in FIGS. 9B and 9C, the antenna 23 of the terminal 2 is wide-angle, and hence the uplink data of the sector 12*a* interferes with the downlink data of the sector 12*b*.

The quality measuring unit 269 of the terminal 2 measures the quality of the received signal. More specifically, the quality measuring unit 269 measures the radio link quality such as the received signal strength indicator (RSSI) of the received signal from the base station 1, the carrier to noise power ratio (CNR), or the like, and outputs the measurement signal to the control unit 27. In this situation, the quality measuring unit 269 measures not only the radio link quality of the entire downlink data bandwidth, but also the radio link quality of the orthogonal frequency division multiplexing (OFDM) symbol unit or the radio link quality of the respective fields in which the downlink data bandwidth is divided into a specific time region.

The control unit 27 reports the quality measurement result to the base station 1 together with the uplink data at timing when a next transmission packet is generated. The base station 1 receives the radio link quality of the downlink which has been reported by the terminal 2, thereby making it possible to grasp the interference quantity of the downlink data bandwidth allocated on the basis of the result of scheduling executed by the base station 1 per se. Accordingly, the base station 1 adaptively changes the downlink data bandwidth (region) by using the results of a delivery acknowledgement (ACK) for the above-mentioned report value and the downlink data.

As described above, the base station 1 uses the radio link quality of the downlink data, the result of the delivery acknowledgement, or the like, from the respective terminals 2, thereby making it possible to grasp the radio link quality of the downlink data bandwidth allocated in advance by the base station 1 per se. The use of the results enables the downlink data bandwidth (region) that prevents a bandwidth (region) in which the radio link quality is deteriorated to be reallocated, or the allocated antenna element 13 to be changed, thereby enabling the radio wave interference between the antenna elements using the same frequency to be reduced.

The above-mentioned operation is autonomously executed by the respective base stations 1, thereby making it possible to improve the throughput of the entire system that produces sectors of the multiple-beam antenna 11 by frequency repetition.

FIGS. 9A-9C illustrate an example in which interference (radio link quality deterioration) between the uplink data channel and the downlink data channel is prevented when four frequencies are repetitively used to provide the sectors. However, this embodiment is not always limited to the above-mentioned configuration. For example, the same frequency can be used in all of the sectors, or the multiple-beam antenna 11 can completely overlap with each other without providing the sector configuration. In this case, not only the interference between the uplink data channel and the downlink data channel, but also the interferences between the uplink data channels and between the downlink data channels are more actualized. However, the operation in this embodiment is autonomously executed by each base station 1, thereby making it possible to reduce the interference, and to improve the throughput of the entire system.

Fourth Embodiment

Figure 11:
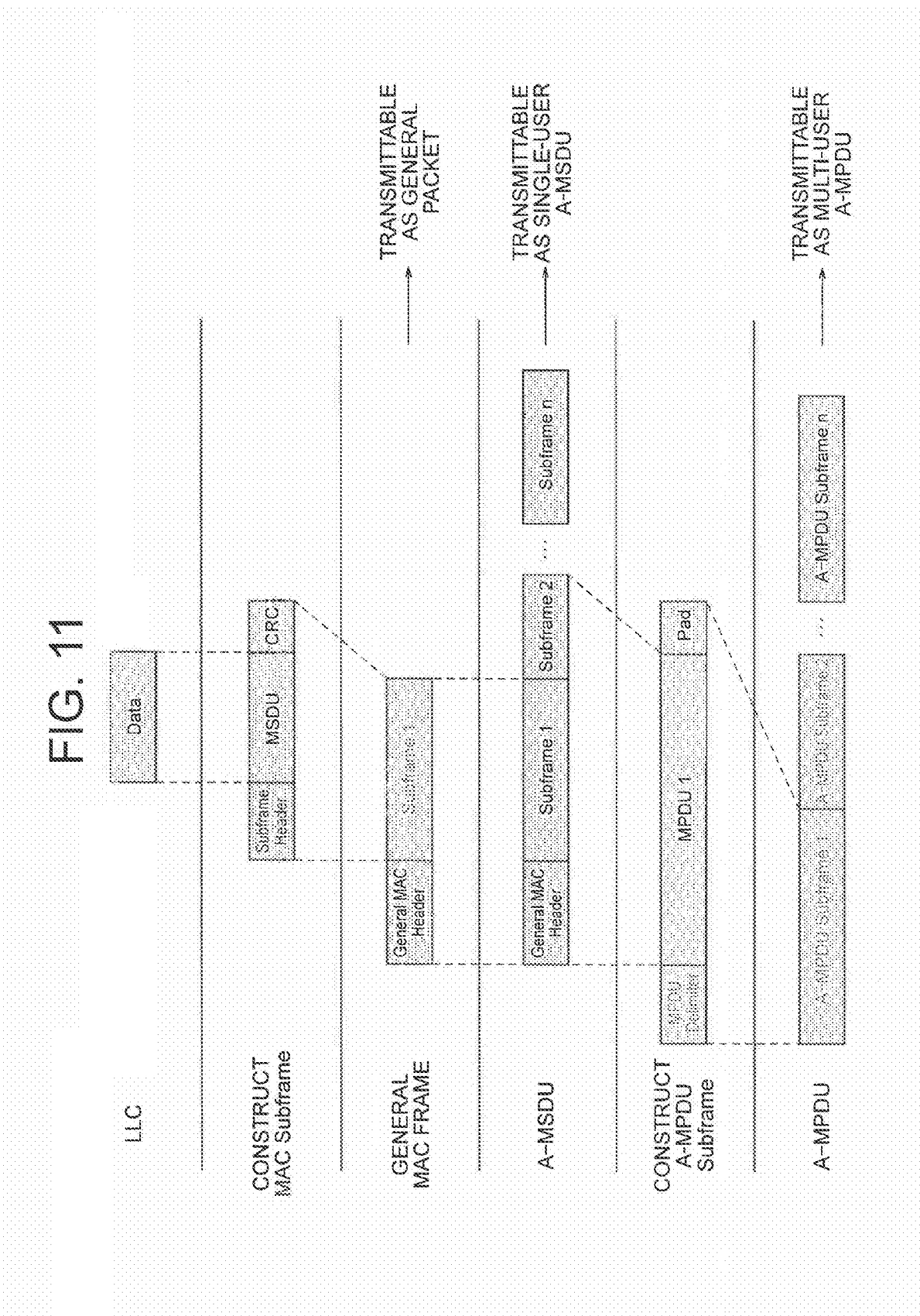
FIG. 11 is a diagram illustrating a detailed configuration of a MAC frame in a radio communication system according to a fourth embodiment of the present invention.

A radio communication system according to a fourth embodiment of the present invention is described with reference to FIGS. 11 to 13. FIG. 11 is a diagram illustrating a detailed configuration of a MAC frame in the radio communication system according to the fourth embodiment of the present invention. A configuration of the radio communication system according to the fourth embodiment is identical with that in the above-mentioned first embodiment.

Referring to FIG. 11, when a medium access control (MAC) receives or generates data, a management frame, or a control frame from an LLC layer higher than a MAC layer as a MAC service data unit (MSDU), a subframe header is allocated to a head, and a cyclic redundancy check (CRC) is allocated to a tail for the subframe header and the MSDU, thereby constituting a MAC subframe. Besides, the subframe header is made up of a delimiter that is a character string for detecting a head position, a type indicative of the type of a subheader, an ACK policy indicative of an ACK policy (NoACK, BlockACK, NormalACK, etc.) for the MSDU, a BlockACKType indicative of the type of Block ACK (Go-back-N, Selective-Repeat, etc.), a CompressedBitmap indicative of whether or not the bitmap information on the BlockACK is compressed, a length indicative of an MSDU length, a traffic ID (TID) indicative of a traffic identifier of the MSDU or a request traffic type, a SequencControl indicative of a sequence number, a fragment number, or a start sequence number at the time of using BA, a last fragmentation for making notification of a fragment state, a reserved and a header check sequence (HCS) for the subframe header as occasion demands, and so on. The configuration of the subframe header is not limited to this embodiment.

The general MAC header is allocated to the head of the MAC subframe to constitute the MAC frame (MAC PDU: MAC Packet Data Unit), and is delivered to the PHY layer. Although being not shown, PHY header indicative of the decoding method and the length of the frame, a header check sequence (HCS), a time/frequency synchronization, an AGC, and a physical layer convergence protocol (PLCP) preamble used for carrier detection, and the like, are allocated to the PHY layer. However, when an FCH indicative of the construction of a frame, etc., are additionally disposed as illustrated in the first embodiment and the second embodiment of the present invention, the PHY header is not always necessary. Besides, the general MAC header is made up of a destination ID as occasion demands, a length indicative of the subframe length, an aggregation indicative of the aggregation type and the ON/OFF of the aggregation, an HCS for the general MAC header, and so on. The construction of the general MAC header is not limited to this embodiment.

Besides, it is possible that the general MAC header is allocated after a plurality of MAC subframes are articulated to each other before the general MAC header is allocated, thereby enabling an aggregated-MSDU (A-MSDU) to be provided. For example, in this situation, it is possible to make notification by the aggregation within the above-mentioned general MAC header. Although being not shown, a pad intended for a byte align is allocated to the tail when the A-MSDU is produced, thereby enabling the head of the frame to be recognized.

Further, a pad intended for the byte align is allocated to a tail of the MAC PDU or the A-MSDU constructed by a single subframe, and an MPDU delimiter that is a specific identifier is allocated to the head in order to recognize the head of the frame, to thereby construct the A-MPDU subframe. Further, a plurality of A-MPDUs are articulated to each other, thereby also making it possible to construct the A-MPDU. The MPDU delimiter is made up of an MPDU length indicative of an MPDU length, a CRC, a delimiter for detecting the head position of the MPDU, and so on. The construction of the MPDU delimiter is not limited to this embodiment.

FIGS. 12 and 13 illustrate a configuration example of the MAC header. The frame control is made up of a protocol version, information indicative of the security frame or not, the transmission type of the ACK, an ACK policy, a frame type, a frame subtype, information indicative of a retransmission frame or not, information indicative of whether data exists subsequently or not, a frame aggregation type, and so on. As illustrated in FIGS. 11, 12, and 13, the MAC header is included in the PLCP service data unit (PSDU) in the description, but may be included in a part of the PLCP header. Further, the order of the respective information elements that construct the MAC header is not limited to this embodiment.

The subframe is made up of information indicative of the MSDU length, fragmentation information, frame aggregation information, and a frame sequence number In the above-mentioned conventional broadband radio system (UWB) or the like, the frame aggregation of the plural destinations and types cannot be installed. However, as described in the fourth embodiment, a system using no frame aggregation being A-MSDU or A-MPDU can be identified by a field within the frame, and hence applications or the combination thereof can be freely selected for each of the terminals. As a result, the constructing method of the frame is flexibly conducted, and an overhead such as MAC header is reduced, and hence the frame can be efficiently generated and transmitted even in the radio communication system with large-capacity transmission using a millimeter wave or the like. Besides, in the aggregation for a plurality of destination addresses, the error rate can be dispersed in the radio transmission line in which the burst error is liable to occur by using the diversity effect or the statistical multiplexing effect. Further, the respective transmission rates of A-MSDU, A-MPDU, and MPDU before conducting the frame aggregation may be changed regardless of whether the plurality of destinations or not.

Besides, as illustrated in FIG. 8 illustrating the above-mentioned second embodiment, the broadcast information (BCCH) and the frame information (FCH) can be transmitted as the beacon frame by constructing the MAC frame with the aid of the frame aggregation as described above. Further, in the downlink data or the uplink data, a data frame and a control frame such as an ACK frame, a command frame, or the like can be undertaken jointly.

Fifth Embodiment

Figure 14:
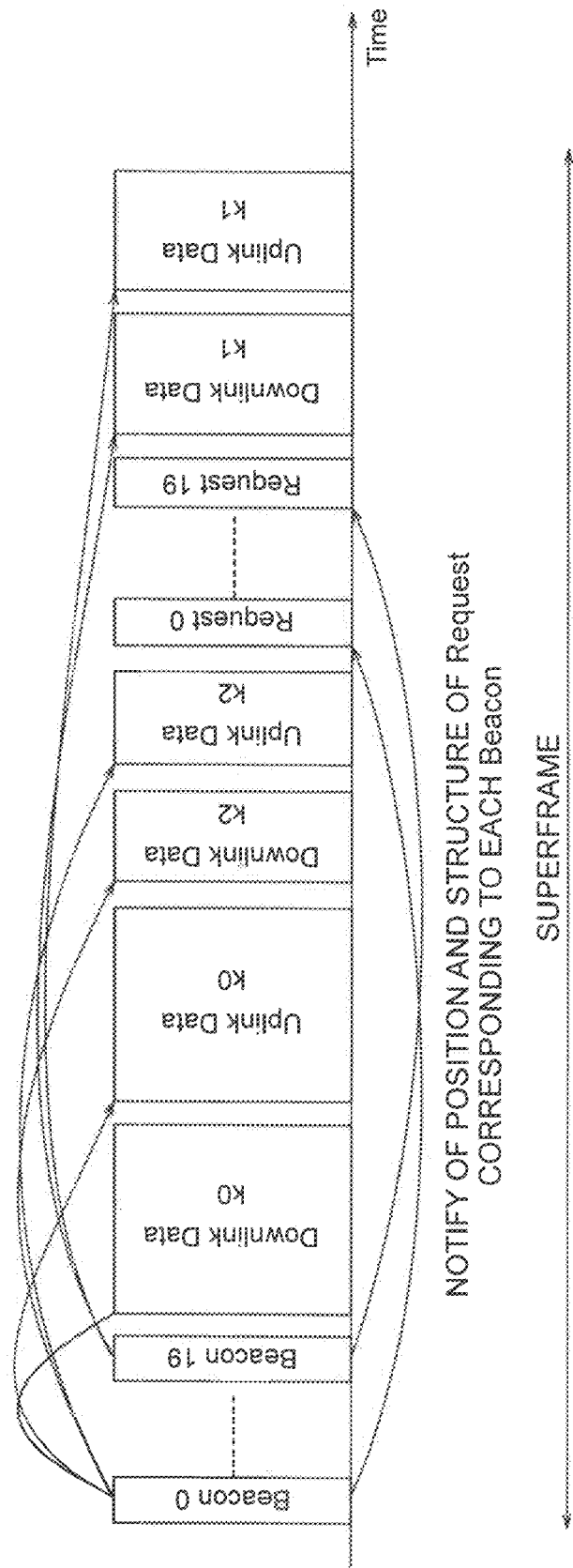
FIG. 14 is a diagram illustrating a configuration of a frame in a radio communication system according to a fifth embodiment of the present invention.

A radio communication system according to a fifth embodiment of the present invention is described with reference to FIGS. 14 to 16. FIG. 14 is a diagram illustrating a detailed configuration of a frame in the radio communication system according to the fifth embodiment of the present invention. The configuration of the radio communication system according to the fifth embodiment is identical with that in the above-mentioned first embodiment.

The structure of the super frame, and the positions and the structures of the respective frames are notified by means of the beacon or the like, thereby making it possible to provide a further flexible frame structure, and even in the radio communication system with the large-capacity transmission using the millimeter wave or the like, it is possible to efficiently generate and transmit the frame.

For example, when the number of beams using the base station 1 is small, and the number of Beacons to be transmitted is small, a permissible processing delay until the terminal 2 transmits an up control frame of the request or the like is short, and thus the notification cannot be executed within the same super frame. In this case, the request field is disposed not immediately after the beacon field but after a given period of time has elapsed, thereby making it possible to shorten the transmission delay of the system total.

Besides, when a short latency is required in a specific data frame or the like, it is possible to allocate the data frame in advance prior to the request field.

FIG. 15 illustrates an example of a broadcast control channel (BCCH) information element that is transmitted by the beacon frame, which corresponds to the MSDU illustrated in FIG. 11. A num FCH and a pointer to FCH are indicative of the position and structure of the respective FCHs illustrated in FIG. 5. A num RCH and a pointer to RCH are indicative of the position and structure of the respective RCH. A beam ID and a num beam are indicative of numbers of the respective Beacons, and the number of beams that are transmitted by the base station. The beam ID received by the terminal 2 is notified the base station 1 of, whereby the base station 1 is capable of recognizing the beam number in combination with the bandwidth that is allocated to the terminal 2. Besides, the total number of beams is notified the terminal 2 of, to thereby find the maximum beam number to be received by the terminal 2. As a result, a time is prevented from being expended in order to unnecessarily complement the beacon. Further, the beam ID and the num beam are recognized, thereby making it possible to recognize a head time of a next request field in the beacon interval, and making it possible to simplify and ensure the reception processing. The order of the respective information elements that constitute the BCCH illustrated in FIG. 15 is not limited to this embodiment.

FIG. 16 illustrates an example of the information element of FCH. TYPE is indicative of any one of up/down, and a specific frame type may be notified by the subframe header illustrated in FIG. 11, or may be notified by the TYPE. The user info makes notification of user specific information such as MAC address or device address, modulation and coding scheme (MCS) or the like. A SLLOT OFFSET and an allocation slot Time make notification of the head positions and the lengths of the respective frames. The order of the respective information elements that constitute the FCH illustrated in FIG. 16 is not limited to this embodiment.

Sixth Embodiment

A radio communication system according to a sixth embodiment of the present invention is described with reference to FIG. 17. FIG. 17 is a diagram illustrating a detailed configuration of a frame in the radio communication system according to the sixth embodiment of the present invention. The configuration of the radio communication system according to the sixth embodiment is identical with that in the above-mentioned first embodiment.

The terminal grasps a time interval of a contention access period (CAP) being a random access period, a channel time allocation period (CTAP) being a bandwidth reservation period, and the like from the superframe construction information included in the broadcast signal (beacon). Besides, a reference timing of the superframe which is grasped by the respective terminals may be based on an offset time till a head beacon #0 and any beacon received by the terminal from the head beacon #0, or may be based on a timing of any beacon received by the terminal. That is, even if the terminal does not grasp a head timing in each of the superframes formed by the base station, the terminal can recognize the cycle of the superframe and the superframe construction information subsequent to any beacon received by the terminal. In the case of using the offset time, the base station announces the offset information, for example, within the respective Beacons, by a time, the number of symbols, the number of beams, or the like.

As described in the above-mentioned first to third embodiments, the Beacons are transmitted from the respective beams in time division so as to sandwich an antenna switch time, individually. Besides, in the CAP period, a random access based on CSMA/CA accepted by the base station 1 by each beam unit is assumed. In a CTAP period, the respective terminals 2 transmit and receive, in time division, the bandwidth allocated by the base station 1 through the random access period. Although being not shown, the CTAP may be further divided into a management CTA (MCTA) that mainly manages the network through the radio base station 1, and a configuration having a CTA mainly used for data communication through the radio base station 1.

As a result, the access control using up/down is enabled in the CAP period, and hence a reply to a connection request (probe request, association request, authentication request, and the like) from the terminal 2 can be implemented within a CAP period. As a result, it is unnecessary to use another control frame or the like, and even in the radio communication system for use with a plurality of beams changing over, or the radio communication system with a large-capacity transmission using a millimeter wave or the like, it is possible to efficiently generate and transmit the frame.

Seventh Embodiment

A radio communication system according to a seventh embodiment of the present invention is described with reference to FIGS. 18 to 20. FIG. 18 is a block diagram illustrating a configuration of a base station in the radio communication system according to the seventh embodiment of the present invention. The configuration of the radio communication system according to the seventh embodiment is identical with that in the above-mentioned first embodiment except for the base station.

In FIG. 18, the same or similar parts to those of FIG. 2 are denoted by identical numerals and symbols, and their description are omitted. A directional antenna unit is configured by a plurality of antenna elements 13 or a plurality of antennas made up of the plurality of antenna elements. A non-directional antenna 18 is, for example, an omni antenna, and is configured to be capable of emitting a radio wave over a relatively wide region which is different from the directional antenna. Reference numeral 174 denotes a non-directional antenna changeover signal, which is a signal for changing over the directional antenna unit or the non-directional antenna 18. For convenience, the frame analyzing unit 171 is interfaced directly with the switching unit 14, but may be interfaced with the switching unit 14 through the modulation/demodulation unit 16 and the IF/RF unit 15.

Figure 19:
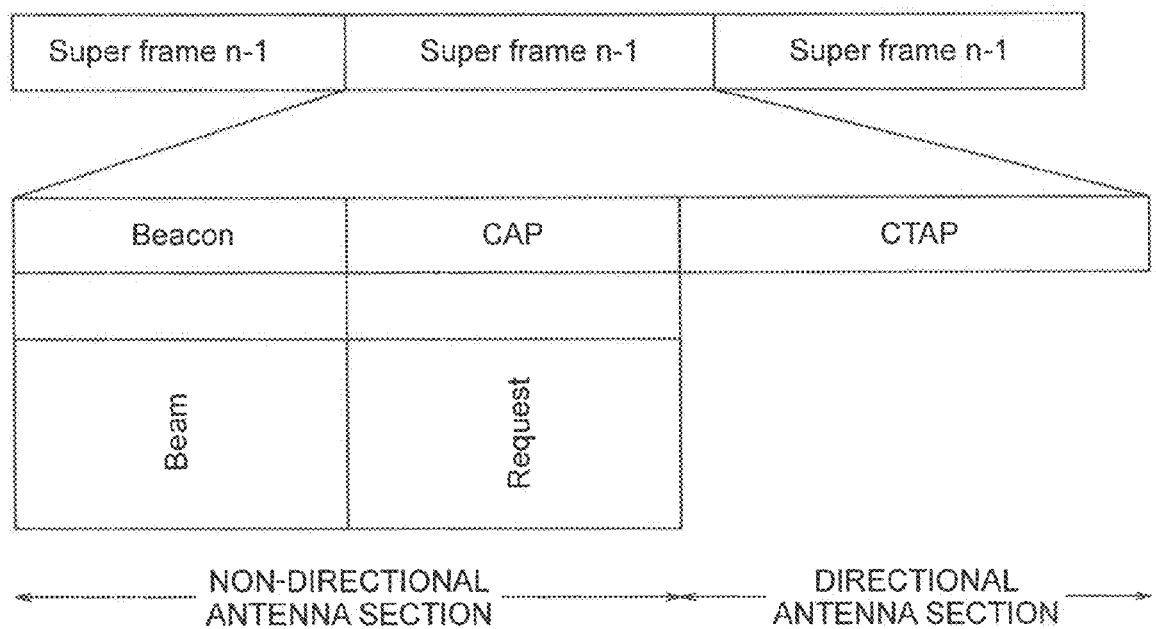
FIG. 19 is a diagram illustrating a configuration of a frame in the radio communication system according to the seventh embodiment of the present invention.

FIG. 19 is a diagram illustrating a configuration of a frame in the radio communication system according to the seventh embodiment of the present invention. As illustrated in FIG. 19, a control frame for access control related to a connection request accepted by the base station 1 by means of the beacon or the CAP uses the non-directional antenna 18, and in a CTAP section to which the bandwidth is allocated, the base station 1 and the terminal 2 communicate with each other with the aid of the directional antenna unit.

Figure 20:
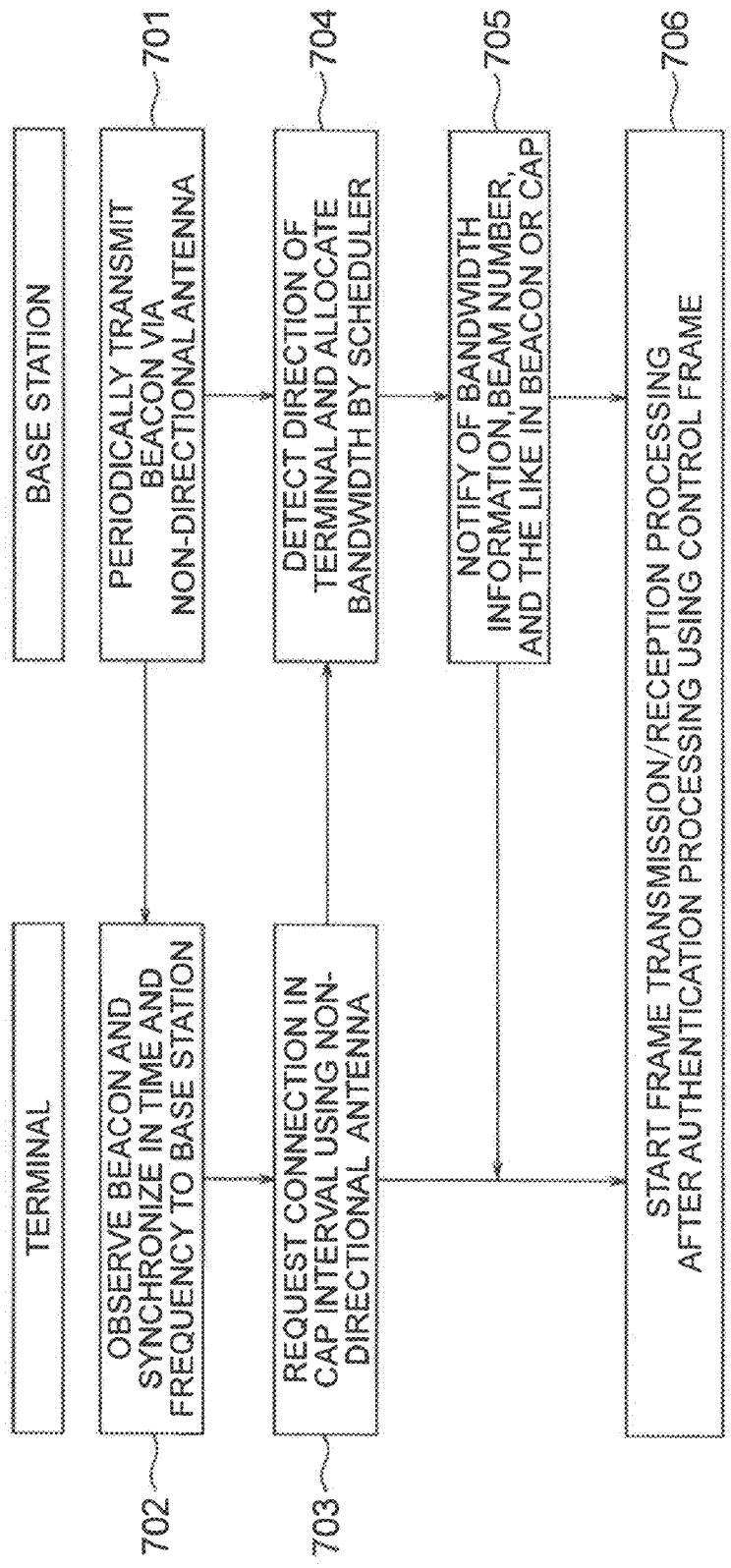
FIG. 20 is a flowchart illustrating a procedure of connecting a terminal to the base station in the radio communication system according to the seventh embodiment of the present invention.

FIG. 20 is a flowchart illustrating a procedure of connecting the terminal to the base station in the radio communication system according to the seventh embodiment of the present invention.

In Step 701, the base station 1 transmits the beacon with the aid of the non-directional antenna 18 on the basis of a cycle of the super frame.

Then, in Steps 702 and 703, the terminal 2 observes the beacon, to physically synchronize with the base station 1 in terms of time and frequency, and to analyze the beacon frame, thereby entering the radio communication system which is formed by the base station 1 by PNID, BSID, or the like. With the use of the structure of the CAP interval which is embedded into the beacon frame or a region in the CAP interval which is determined by the system in advance, the terminal 2 makes a connection request to the base station 1 with the aid of the non-directional antenna 18.

In Steps 704 and 705, in this situation, the base station 1 detects a direction along which the terminal 2 exists, and a beam number or a direction of the base station 1 per se on the basis of the phase information of a radio frequency received by the antenna element. Alongside, the base station 1 executes scheduling processing on the basis of a received electric power, interference to noise power ratio information, or the like, which is calculated by receiving the QoS, the service type, and the radio frame from the terminal 2 received in response to the connection request, and reserves the bandwidth of the terminal 2 when the base station 1 can meet the request. The reserved bandwidth makes notification of the structure of the super frame, the beam number, and the like in the beacon or the CAP interval. Besides, in Step 702, when a specific identifier for identifying the respective radio system is superimposed on the preamble of the physical frame by diffusing processing with respect to the preamble pattern or the like, it is possible to mix different radio systems together, for example, a single carrier system such as the ASK with OFDM or the like. In addition, the results of identifying the different radio systems are notified the PLCP header or RX VECTOR, etc., the PHY layer, the MAC layer, and also the application layer of, thereby making it possible to exclusively control and receive the base station equipped with different radio systems and the terminal within the same system.

In this time, in the case of the radio communication system using a millimeter wave or the like larger in propagation attenuation than a microwave, when the radio wave is emitted by the non-directional antenna 18, there may be a case in which a communication distance is extremely short without meeting a required S/N when using the modulation scheme having the same transmission speed, the same coding ratio, and the same band width as those of the data frame. For that reason, in the case of using the non-directional antenna 18, as compared with a case where the data frame is transmitted, transmission may be executed at a lower transmission speed, or transmission may be executed with a narrower band width. Further, a radio frequency different from the radio frequency at which the data frame is transmitted may be used. In Step 706, the base station 1 and the terminal 2 transmit and receive the control frame with the aid of the non-directional antenna, thereby transmitting and receiving the data frame with the aid of the directional antenna after conducting authentication processing. The number and direction of the directional antenna used in this example are notified the terminal 2 of from the base station 1 with the aid of the beacon section, the CAP interval, or the like.

As described above, in the control frame such as the beacon or the connection request (request), the non-directional antenna 18 is used, thereby making it possible to delete various overheads such as the number of transmitted beacon frames, the PLCP header, the MAC header, or the beam switching time. Similarly, in the radio communication system with the large-capacity transmission using the millimeter wave or the like, it is possible to efficiently generate and transmit the frame. Further, as compared with a case in which the directional antenna is used, it is possible to reduce the complexity related to the connection procedure, and the connection time.

In the seventh embodiment, it is assumed that the non-directional antenna 18 is used for only the control frame. However, when the communication distance or the transmission speed is permitted, it is needless to say that the data frame can be transmitted with the aid of the non-directional antenna 18.

Eighth Embodiment

A radio communication system according to an eighth embodiment of the present invention is described with reference to FIGS. 21 and 22. The configuration of the base station in the radio communication system according to the eighth embodiment is identical with that in the above-mentioned seventh embodiment illustrated in FIG. 18. The configuration of the radio communication system according to the eighth embodiment is identical with that in the above-mentioned first embodiment except for the base station.

Figure 21:
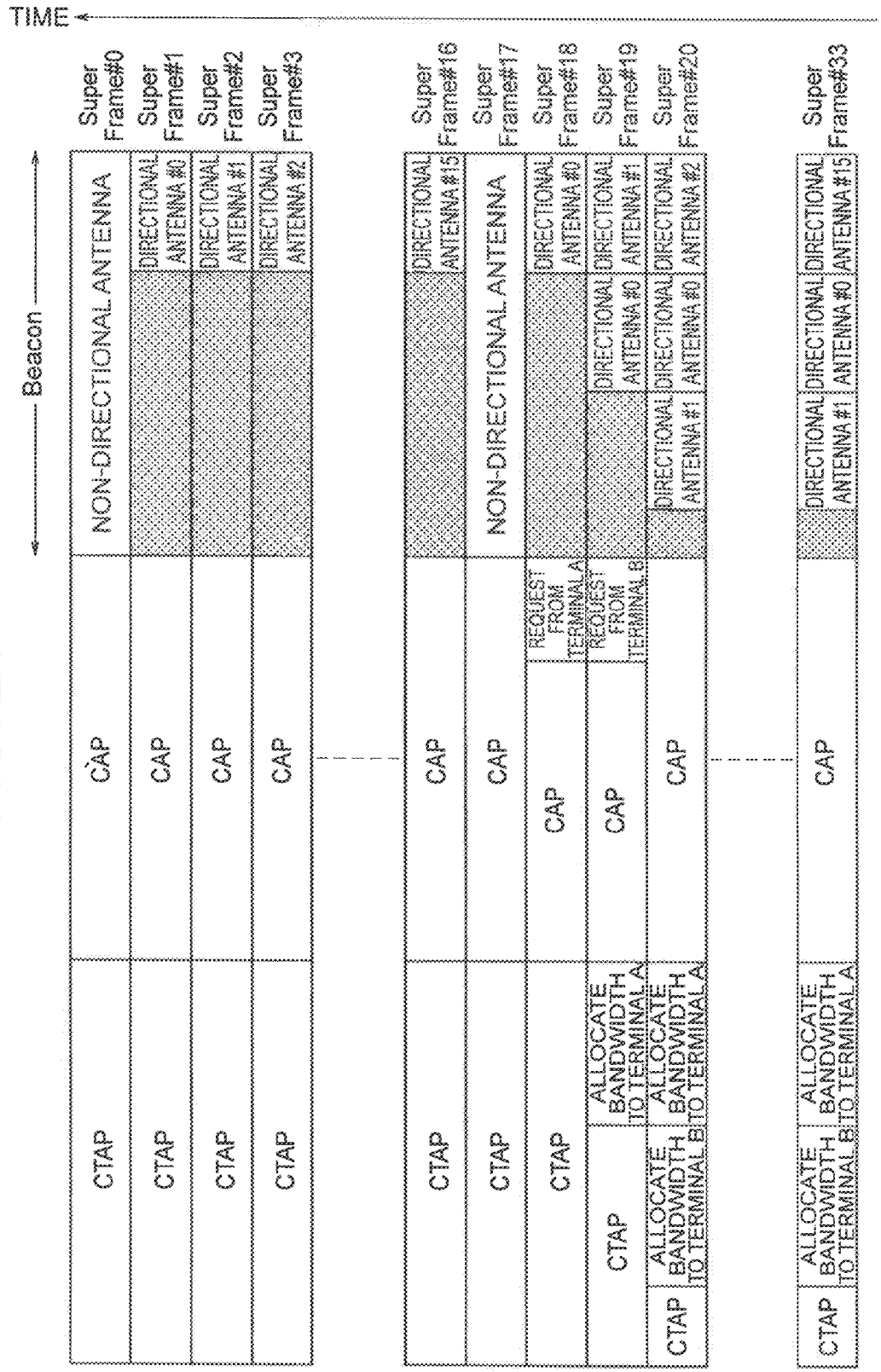
FIG. 21 is a diagram illustrating a configuration of a frame in a radio communication system according to an eighth embodiment of the present invention.

FIG. 21 is a diagram illustrating a configuration of a frame in the radio communication system according to the eighth embodiment of the present invention. As illustrated in FIG. 21, a control frame for access control related to a connection request accepted by the base station 1 by means of the beacon or the CAP uses the non-directional antenna 18 or the directional antenna 13, and in a CTAP section to which the bandwidth is allocated, the base station 1 and the base station 2 communicate with each other with the aid of the directional antenna unit.

For example, the transmission of the beacon using the non-directional antenna 18 is made to super frames #0, #17, and #34, and the transmission of the beacon using the directional antenna 13 is made once to 17 super frames such that the directional antenna #0 is directed to super frames #1, #18, and #35, the directional antenna #1 is directed to super frames #2, #19, #36, the directional antenna #2 is directed to super frames #3, #20, #37, the directional antenna #15 is directed to super frames #16, #33, and #50.

Besides, when the base station 1 receives the connection request from the terminal 2 in the CAP region with the aid of the non-directional antenna 18 or the directional antenna 13, the base station 1 analyzes information on the received electric power of the connection request frame, the arrival direction, or the like to determine the directional antenna 13 suitable for a communication with the terminal. In the super frame after the reception of accepting the connection request, the base station 1 transmits the beacon toward the terminal from which the connection request has been received with the aid of the directional antenna.

In FIG. 21, the base station 1 receives the connection request from a terminal A in the CAP region of the super frame #18, whereby the base station 1 is capable of suggestively recognizing that the terminal A could receive the beacon with the aid of the directional antenna #0 transmitted by the base station 1 per se. Besides, when the base station 1 analyzes the connection request frame from the terminal A, it is also possible to explicitly recognize the fact. As a result, in order that the terminal A can receive each super frame and beacon after super frame #19, the base station 1 transmits each super frame beacon by the directional antenna #0, and the terminal A receives each frame beacon, thereby enabling the allocation information of the bandwidth to be obtained. The same is applied to a terminal B.

In FIG. 21, the region of the beacon is a fixed region, but may be a variable length region. In that case, the beacon region or a start position of the CAP may be indicated by the beacon of the subject super frame. The beacon of the previous super frame or the like may be notified prior to the subject super frame.

Further, the transmission of the beacon using the non-directional antenna 18 and the respective directional antennas 13 may not be always conducted every 17 super frames, for example, as illustrated in FIG. 21. The transmission may be conducted every 34 super frames, or every 68 super frames. Besides, there is no need that the respective antennas execute transmission in the same cycle. Further, the cycle in which the beacon is transmitted is not always a given cycle. In this situation, when the region of the beacon does not exists in a specific super frame, the region of the CAP or the CTAP may be allocated instead of the beacon. In this way, when the transmission cycle, the region or the like of the beacon is changed, the change is notified by using the previous super frame or the like prior to the subject super frame.

FIG. 22 is a flowchart illustrating a procedure of connecting the terminal to the base station in the radio communication system according to the eighth embodiment of the present invention.

The base station 1 transmits the beacon with the aid of the non-directional antenna 18 and the directional antenna 13 on the basis of the cycle of the super frame (Steps 801 and 803). The terminal 2 observes the beacon to physically synchronize a time and a frequency with the base station 1 (Steps 802 and 804), and analyzes the beacon frame to enter the radio communication system that is formed by the base station 1 through the PNID, the BSID, and the like.

The terminal 2 makes a connection request to the base station 1 with the use of the non-directional antenna 18 with the aid of the structure of the CAP interval embedded into the beacon frame or the region of the CAP interval determined by the system in advance (Step S805). In this situation, the base station 1 detects a direction along which the terminal exists, and a beam number or a direction of the base station 1 per se on the basis of at least one of the calculation results of phase information on the radio frequency, etc., received by the antenna element, and the explicit determination made by analyzing a frame of the connection request received from the terminal. Alongside, the base station 1 executes scheduling processing on the basis of a received electric power, interference to noise power ratio information, or the like, which is calculated by receiving the QoS, the service type, and the radio frame from the terminal received in response to the connection request, and reserves and allocates the bandwidth of the subject terminal when the base station 1 can meet the request (Step 806). The reserved bandwidth makes notification of the structure of the super frame, the beam number, and the like in the beacon or the CAP interval. Besides, the base station 1 transmits each super frame beacon so that the terminal 2 that has received the connection request can receive each superframe beacon (Step 807).

In this time, in the case of the radio communication system using a millimeter wave or the like larger in propagation attenuation than the microwave, when the radio wave is emitted by the non-directional antenna 18, there may be a case in which a communication distance is extremely short without meeting a required S/N when using the modulation scheme having the same transmission speed, the same coding ratio, and the same band width as those of the data frame. For that reason, in the case of using the non-directional antenna 18, as compared with a case where the data frame is transmitted, transmission may be executed at a lower transmission speed, or transmission may be executed with a narrower band width.

As described above, in the control frame such as the beacon or the connection request (request), the non-directional antenna 18 and the directional antenna 13 are used in combination, thereby making it possible to delete various overheads such as the number of transmitted beacon frames, the PLCP header, the MAC header, the beam switching time, and the like. Similarly, in the radio communication system with the large-capacity transmission using the millimeter wave or the like, it is possible to efficiently generate and transmit the frame. Further, as compared with a case in which only the directional antenna 13 or the non-directional antenna 18 is used, it is possible to reduce the complexity related to the connection procedure, and the connection time.

In the eighth embodiment, it is assumed that the data frame uses the directional antenna 13. However, when the communication distance or the transmission speed is permitted, it is needless to say that the data frame can also be transmitted with the aid of the non-directional antenna 18.

What is claimed is:

1. A radio communication system that conducts a communication between a base station and a plurality of terminals wirelessly, wherein the base station comprises a multiple-beam antenna made up of a plurality of antennas, and emits radio waves having a same frequency at a same timing from the multiple-beam antenna toward a plurality of specific areas corresponding to the plurality of antennas without overlapping by time division to form a plurality of spot beams, wherein radio frames transmitted between the base station and the terminals each comprise a plurality of beacon channels which are channels from the base station to all of the terminals and are allocated for each of the antennas, a plurality of request channels which are channels from all of the terminals to the base station and are allocated for each of the antennas, and a downlink channel and an uplink channel allocated to a request terminal, the plurality of request channels being arranged within each radio frame between the plurality of beacon channels and the downlink channel, each of the plurality of beacon channels and request channels within each of the radio frames has the same frequency, wherein the base station transmits broadcast information including information for identifying the antenna from each of the plurality of antennas through the plurality of beacon channels, wherein when a terminal that exists in any one of the plurality of specific areas receives the broadcast information through the beacon channel, the terminal selects an optimum beacon channel from the plurality of beacon channels, and transmits a communication establishment request including information for identifying the antenna and a bandwidth request including a desired communication bandwidth to the base station through a single request channel which, among the plurality of request channels, corresponds to the information for identifying the antenna, which is included in the broadcast information received through the selected optimum beacon channel, and wherein when the base station receives the communication establishment request and the bandwidth request through the request channel, the base station determines whether or not a channel is to be allocated to the frame for the request terminal, and when the channel is allocated, the base station schedules a modulation scheme and an encoding scheme for communicating with the request terminal, and a channel allocation time including the downlink data channel and the uplink data channel.

2. A radio communication system according to claim 1, wherein the multiple-beam antenna is made up of a plurality of sectors, and each of the sectors is made up of a plurality of antennas, and emits a radio wave different in frequency from an adjacent sector, and emits a radio wave identical in frequency to a spaced-apart sector.

3. A radio communication system according to claim 1, wherein the base station determines a connection time for each of the antennas, and controls a channel allocation time for communicating with the request terminal based on a traffic quantity grasped through the communication establishment request and the bandwidth request from the terminal, which are received from the plurality of antennas through the request channels.

4. A radio communication system according to claim 1, wherein the base station notifies the request terminal of presence/absence of a frame control header and a position of the frame control header within the frame through the beacon channel, and notifies the request terminal of the channel allocation time through the frame control header included in the downlink data channel.

5. A radio communication system according to claim 1, wherein the base station notifies the request terminal of the channel allocation time through the beacon channel.

6. A radio communication system according to claim 2, wherein the base station controls a construction of the frames of the sectors using the same frequency so that the downlink data channel and the uplink data channel, the downlink data channels, or the uplink data channels do not interfere with each other between the sectors using the same frequency.

7. A radio communication method of conducting a communication between a base station and a plurality of terminals wirelessly, the base station comprising a multiple-beam antenna made up of a plurality of antennas, and emits radio waves having a same frequency at a same timing from the multiple-beam antenna toward a plurality of specific areas corresponding to the plurality of antennas without overlapping in time division to form a plurality of spot beams, radio frames transmitted between the base station and the terminals each comprising a plurality of beacon channels which are channels from the base station to all of the terminals and are allocated for each of the antennas, a plurality of request channels which are channels from all of the terminals to the base station and are allocated for each of the antennas, and a downlink channel and an uplink channel allocated to a request terminal, the plurality of request channels being arranged within each radio frame between the plurality of beacon channels and the downlink channel, each of the plurality of beacon channels and request channels within each of the radio frames has the same frequency, the radio communication method comprising the steps of:

transmitting broadcast information including information for identifying the antenna from each of the plurality of antennas through the plurality of beacon channels;

upon reception of the broadcast information through the beacon channel, selecting an optimum beacon channel from the plurality of beacon channels, and transmitting a communication establishment request including information for identifying the antenna and a bandwidth request including a desired communication bandwidth from a terminal that exists in any one of the plurality of specific areas to the base station through a single request channel which, among the plurality of request channels, corresponds to the information for identifying the antenna, which is included in the broadcast information received through the selected optimum beacon channel; and upon reception of the communication establishment request and the bandwidth request through the request channel, determining whether or not a channel is to be allocated to the frame for the request terminal, and when the channel is allocated, scheduling a modulation scheme and an encoding scheme for communicating with the request terminal, and a channel allocation time including the downlink data channel and the uplink data channel.

8. A radio communication method according to claim 7, wherein the multiple-beam antenna is made up of a plurality of sectors, and each of the sectors is made up of a plurality of antennas, and emits a radio wave different in frequency from an adjacent sector, and emits a radio wave identical in frequency to a spaced-apart sector.

9. A radio communication method according to claim 7, wherein the base station determines a connection time for each of the antennas, and controls a channel allocation time for communicating with the request terminal based on a traffic quantity grasped through the communication establishment request and the bandwidth request from the terminal, which are received from the plurality of antennas through the request channels.

10. A radio communication method according to claim 7, wherein the base station notifies the request terminal of presence/absence of a frame control header and a position of the frame control header within the frame through the beacon channel, and notifies the request terminal of the channel allocation time through the frame control header included in the downlink data channel.

11. A radio communication method according to claim 7, wherein the base station notifies the request terminal of the channel allocation time through the beacon channel.

12. A radio communication method according to claim 8, wherein the base station controls a construction of the frames of the sectors using the same frequency so that the downlink data channel and the uplink data channel, the downlink data channels, or the uplink data channels do not interfere with each other between the sectors using the same frequency.

* * * * *